(12) United States Patent
Zhao et al.

(10) Patent No.: US 11,875,598 B2
(45) Date of Patent: Jan. 16, 2024

(54) FINGERPRINT ANTI-COUNTERFEITING METHOD AND ELECTRONIC DEVICE

(71) Applicant: Huawei Technologies Co., Ltd., Shenzhen (CN)

(72) Inventors: Xiaona Zhao, Shenzhen (CN); Bing Chang, Beijing (CN); Shuiping Long, Beijing (CN); Teng Shi, Nanjing (CN); Danhong Li, Shenzhen (CN); Li Zhang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/627,471

(22) PCT Filed: Jul. 15, 2020

(86) PCT No.: PCT/CN2020/102082
§ 371 (c)(1),
(2) Date: Jan. 14, 2022

(87) PCT Pub. No.: WO2021/008551
PCT Pub. Date: Jan. 21, 2021

(65) Prior Publication Data
US 2022/0262161 A1  Aug. 18, 2022

(30) Foreign Application Priority Data
Jul. 17, 2019 (CN) .......................... 201910644285.5

(51) Int. Cl.
*G06V 40/12* (2022.01)

(52) U.S. Cl.
CPC ...... *G06V 40/1365* (2022.01); *G06V 40/1388* (2022.01)

(58) Field of Classification Search
CPC ....... G06V 40/12–1394; G06V 10/757; G06V 10/80–817; G06V 30/198;
(Continued)

(56) References Cited

U.S. PATENT DOCUMENTS 5,719,950 A * 2/1998 Osten ..................... G06V 40/40
340/5.82
8,180,120 B2   5/2012 Hook
(Continued)

FOREIGN PATENT DOCUMENTS

CN   103324944 A   9/2013
CN   103839072 A   6/2014
(Continued)

OTHER PUBLICATIONS

Hammad, M. et al., "Multimodal Biometric Authentication Systems using Convolution Neural Network Based on Dufferent Level Fusion of ECG and Fingerprint", IEEE Access, Dec. 13, 2018, 16 Pages.
(Continued)

*Primary Examiner* — Amr A Awad
*Assistant Examiner* — Aaron Midkiff
(74) *Attorney, Agent, or Firm* — Slater Matsil, LLP

(57) ABSTRACT

An electronic device detects a first operation of a user; the electronic device obtains a fingerprint image and a touch signal in response to the first operation; and the electronic device determines, based on the fingerprint image and the touch signal, that the fingerprint image is a fingerprint image of a real finger or a fingerprint image of a fake finger.

18 Claims, 22 Drawing Sheets

(58) Field of Classification Search
CPC ........ G06V 30/2252; G06F 18/25–259; G06F 3/04166–041662; G06F 2203/04106; G06F 3/0416–041662; G06F 21/32
See application file for complete search history.

(56) References Cited

U.S. PATENT DOCUMENTS

| | | | | |
|---|---|---|---|---|
| 2004/0264742 | A1* | 12/2004 | Zhang | G06V 40/1347 382/115 |
| 2010/0045432 | A1* | 2/2010 | Abe | G06V 40/45 340/5.83 |
| 2014/0129843 | A1 | 5/2014 | Shi et al. | |
| 2016/0246396 | A1* | 8/2016 | Dickinson | G06V 40/1347 |
| 2018/0369866 | A1* | 12/2018 | Sammoura | B06B 1/0622 |
| 2020/0065540 | A1* | 2/2020 | Small | G06V 10/26 |

FOREIGN PATENT DOCUMENTS

| | | |
|---|---|---|
| CN | 103886297 A | 6/2014 |
| CN | 105303179 A | 2/2016 |
| CN | 105373786 A | 3/2016 |
| CN | 105739897 A | 7/2016 |
| CN | 103544474 B | 8/2016 |
| CN | 105843500 A | 8/2016 |
| CN | 106802710 A | 6/2017 |
| CN | 106951767 B | 7/2017 |
| CN | 107004126 A | 8/2017 |
| CN | 107194228 A | 9/2017 |
| CN | 108564040 A | 9/2018 |
| CN | 109063572 A | 12/2018 |
| CN | 109189256 A | 1/2019 |
| CN | 109643379 A | 4/2019 |
| CN | 110020622 B | 7/2019 |
| KR | 20150139396 A | 12/2015 |
| WO | 2018126368 A1 | 7/2018 |
| WO | 2019078769 A1 | 4/2019 |

OTHER PUBLICATIONS

Komeili, M. et al., "Liveness Detection and Automatic Template Updating Using Fusion of ECG and Fingerprint", IEEE Transactions on Information Forensics and Security, Jul. 2018, 13 Pages, vol. 13, No. 7.

Shen, C. et al., "Performance Analysis of Touch-Interaction Behavior for Active Smartphone Authentication", IEEE Transactions on Information Forensics and Security, Mar. 2016, 16 Pages, vol. 11, No. 3.

Hossam Hassan et al., "CMOS Capacitive Fingerprint Sensor Based on Differential Sensing Circuit with Noise Cancellation", Sensors 2018, Jul. 8, 2018, 17 pages.

* cited by examiner

FINGERPRINT ANTI-COUNTERFEITING METHOD AND ELECTRONIC DEVICE

CROSS-REFERENCE TO RELATED APPLICATIONS

This application is a National Stage of International Application No. PCT/CN2020/102082, filed on Jul. 15, 2020, which claims priority to Chinese Patent Application No. 201910644285.5, filed on Jul. 17, 2019. Both of the aforementioned applications are hereby incorporated by reference in their entireties.

TECHNICAL FIELD

This application relates to the field of electronic devices, and more specifically, to a fingerprint anti-counterfeiting method and an electronic device.

BACKGROUND

Fingerprints, as a very common biometric feature, have been widely used in identity authentication in the fields of mobile phone unlocking, finance, access control, and the like. However, a current fingerprint matching recognition system usually has difficulty in recognizing real and fake fingerprints, and is easily exposed to a risk of fraud attacks.

For example, in an under-display or in-display optical fingerprint recognition solution that is gradually used at present, a two-dimensional fingerprint image of a finger above a screen is captured by using optical principles (light reflection and refraction), which is easily exposed to attacks of low-cost and easy-to-produce fake fingerprints (especially 3D fake fingerprints made of materials such as silicone). Consequently, users' assets, property, and the like are subject to loss risks, and impact is wide.

SUMMARY

This application provides a fingerprint anti-counterfeiting method and an electronic device, to help improve accuracy in recognizing a fake fingerprint.

According to a first aspect, a fingerprint anti-counterfeiting method is provided. The method is applied to an electronic device, and the method includes: The electronic device obtains a fingerprint image and a multi-frame touch signal; and the electronic device determines, based on the fingerprint image and the multi-frame touch signal, that the fingerprint image is a fingerprint image of a real finger or a fingerprint image of a fake finger.

In some possible implementations, the method includes: The electronic device detects a first operation; the electronic device obtains the fingerprint image and the multi-frame touch signal in response to the first operation; and the electronic device determines, based on the fingerprint image and the multi-frame touch signal, that the fingerprint image is a fingerprint image of a real finger or a fingerprint image of a fake finger.

It should be noted that, the first operation includes but is not limited to an operation, performed by a user, of touching, pressing, or approaching, at a preset distance, a device such as a screen or a power button of the electronic device, so that the electronic device can trigger collection of the fingerprint image and the multi-frame touch signal after sensing the operation.

According to the fingerprint anti-counterfeiting method in this embodiment of this application, whether the fingerprint image is from a live finger is determined by using the obtained fingerprint image and touch signal, which helps improve accuracy in detecting a fake fingerprint, and effectively defends against a fake fingerprint attack faced by a current fingerprint matching recognition solution. In addition, no other new hardware is required, avoiding high costs.

With reference to the first aspect, in some implementations of the first aspect, the multi-frame touch signal includes: a multi-frame touch signal collected synchronously when the fingerprint image is collected; or a multi-frame touch signal collected synchronously when the fingerprint image is collected, and a multi-frame touch signal buffered before the fingerprint image is collected.

With reference to the first aspect, in some implementations of the first aspect, the fingerprint image is a non-first fingerprint image, and the touch signal is a multi-frame touch signal synchronously collected when the first fingerprint image is collected.

With reference to the first aspect, in some implementations of the first aspect, after the electronic device obtains the fingerprint image and the multi-frame touch signal, the method further includes: The electronic device preprocesses the multi-frame touch signal based on a screen status or a touch collection frequency of the electronic device. The preprocessing includes one or more of interpolation processing, zero padding processing, and downsampling processing.

It should be noted that, a result of the preprocessing is that a frame quantity of the multi-frame touch signal is increased or reduced, to meet a subsequent use requirement. A specific implementation of the preprocessing is not limited in this embodiment of this application. For example, a quantity of touch signal frames may be increased by replicating at least one copy.

With reference to the first aspect, in some implementations of the first aspect, after the electronic device obtains the fingerprint image and the multi-frame touch signal, the method further includes: The electronic device obtains, through truncation, a touch signal with a predetermined frame quantity or a predetermined size.

It should be noted that the electronic device may obtain, through truncation, the touch signal with the predetermined frame quantity or the predetermined size after preprocessing the multi-frame touch signal, or may perform the preprocessing on the truncated touch signal after the touch signal with the predetermined frame quantity or the predetermined size is obtained through truncation. The predetermined size may be a predetermined value specified for a size of each frame of touch signal. For example, it is assumed that when represented by using a mathematical matrix, the touch signal is a matrix of A*B dimensions (A and B are integers greater than 0), and after truncation, is a matrix of a*b dimensions (a and b are greater than 0 and are integers less than or equal to A and B, separately).

With reference to the first aspect, in some implementations of the first aspect, the electronic device stores a multi-modal network, and the multi-modal network includes a fingerprint image subnetwork and a touch signal subnetwork. That the electronic device determines that the fingerprint image is a fingerprint image of a real finger or a fingerprint image of a fake finger includes: The electronic device inputs the fingerprint image into the fingerprint image subnetwork for processing, to obtain a first eigenvector; the electronic device inputs the multi-frame touch signal into the touch signal subnetwork for processing, to obtain a second eigenvector; the electronic device fuses the first eigenvector with the second eigenvector to obtain a third eigenvector;

the electronic device classifies the third eigenvector to obtain a classification result; and the electronic device determines, based on the classification result, that the fingerprint image is a fingerprint image of a real finger or a fingerprint image of a fake finger.

It should be noted that, when fusing the first eigenvector with the second eigenvector, the electronic device may further weight the first eigenvector and the second eigenvector, to obtain the third eigenvector. For example, the first eigenvector is multiplied by a first weighting coefficient, the second eigenvector is multiplied by a second weighting coefficient, and then the first eigenvector and the second eigenvector separately multiplied by the weighting coefficients are fused to obtain the third eigenvector.

With reference to the first aspect, in some implementations of the first aspect, that the electronic device determines, based on the classification result, that the fingerprint image is a fingerprint image of a real finger or a fingerprint image of a fake finger includes: If the classification result includes a first confidence, and the first confidence is greater than or equal to a first threshold, the electronic device determines that the fingerprint image is a fingerprint image of a real finger, where the first confidence is a confidence at which the fingerprint image is a fingerprint image of a real finger; or if the classification result includes a second confidence, and the second confidence is greater than or equal to a second threshold, the electronic device determines that the fingerprint image is a fingerprint image of a fake finger, where the second confidence is a confidence at which the fingerprint image is a fingerprint image of a fake finger. The first threshold and the second threshold are adjustable.

It should be noted that the first threshold and the second threshold are adjustable. A specific implementation is as follows: For example, the electronic device determines a value of the first threshold or the second threshold or the like based on the screen status or other information (such as fingerprint image quality and touch signal strength). Certainly, the first threshold and the second threshold may alternatively be fixed preset values.

In some possible implementations, that the electronic device determines that the fingerprint image is a fingerprint image of a real finger or a fingerprint image of a fake finger includes: The electronic device inputs the fingerprint image into the fingerprint image subnetwork for processing, to obtain a first classification result; the electronic device sends the multi-frame touch signal to the touch signal subnetwork for processing, to obtain a second classification result; and the electronic device determines, based on the first classification result and the second classification result, that the fingerprint image is a fingerprint image of a real finger or a fingerprint image of a fake finger.

In this embodiment of this application, the fingerprint image and the touch signal are input into the multi-modal network for fingerprint anti-counterfeiting processing, which helps improve accuracy in determining a real fingerprint and determining a fake fingerprint, when compared with a method for fingerprint anti-counterfeiting processing based on a single mode (for example, based solely on a fingerprint image).

With reference to the first aspect, in some implementations of the first aspect, the method further includes: Before inputting the fingerprint image and the touch signal into the multi-modal network, the electronic device fuses the fingerprint image with the multi-frame touch signal; and after inputting the fingerprint image and the multi-frame touch signal into the multi-modal network, the electronic device separates the fingerprint image and the multi-frame touch signal.

In this embodiment of this application, the electronic device may fuse the touch signal with the fingerprint image. In this way, complexity of data transmission to the multi-modal network may be reduced to some extent, so as to simplify an implementation.

In some possible implementations, after inputting the fingerprint image and the multi-frame touch signal into the multi-modal network, the electronic device separates the fingerprint image and the multi-frame touch signal, and then inputs the separated fingerprint image into the fingerprint image subnetwork and the separated multi-frame touch signal into the touch signal subnetwork.

With reference to the first aspect, in some implementations of the first aspect, after the electronic device obtains the fingerprint image and the multi-frame touch signal, the method further includes: The electronic device performs normalization processing on the fingerprint image and the multi-frame touch signal.

In some possible implementations, that the electronic device performs normalization processing on the fingerprint image and the multi-frame touch signal includes: The electronic device normalizes element values of data corresponding to the fingerprint image to be in a first range; and the electronic device normalizes element values of data corresponding to the multi-frame touch signal to be in a second range.

In some possible implementations, the first range is the same as the second range.

With reference to the first aspect, in some implementations of the first aspect, when the electronic device determines that the fingerprint image is a fingerprint image of a fake finger, the method further includes: The electronic device sends fake fingerprint prompt information to the user; or the electronic device sends operation failure prompt information to the user.

It should be noted that the sending operation failure prompt information to the user is specifically as follows: For example, in the case of mobile phone unlocking, the user is prompted that fingerprint/identity authentication failed and the unlocking failed, and in the case of making a payment, the user is prompted that fingerprint/identity authentication failed and the payment failed.

In this embodiment of this application, when determining that the fingerprint image is a fingerprint image of a fake finger, the electronic device may send prompt information to the user, to help defend against an attack of a 3D fake fingerprint or a 2D fake fingerprint.

With reference to the first aspect, in some implementations of the first aspect, when the electronic device determines that the fingerprint image is a fingerprint image of a real finger, the method further includes: The electronic device determines that the fingerprint image matches a fingerprint image preset by a user; and the electronic device determines that user identity authentication succeeds.

With reference to the first aspect, in some implementations of the first aspect, the multi-frame touch signal is used to represent one or more of touch strength, a touch strength change trend, a touch shape, and a touch shape change trend.

According to a second aspect, a fingerprint anti-counterfeiting method is provided. The method is applied to an electronic device, and the electronic device includes a secure area. The method includes: The secure area obtains a fingerprint image and a multi-frame touch signal; and the secure area determines, based on, the fingerprint image and the multi-frame touch signal, that the fingerprint image is a fingerprint image of a real finger or a fingerprint image of a fake finger.

In some possible implementations, the secure area may be a trusted execution environment TEE.

According to the fingerprint anti-counterfeiting method in this embodiment of this application, whether the fingerprint image is from a live finger is determined by using the obtained fingerprint image and touch signal, which helps improve accuracy in detecting a fake fingerprint, and effectively defends against a fake fingerprint attack faced by a current fingerprint matching recognition solution. In addition, no other new hardware is required, avoiding high costs.

With reference to the second aspect, in some implementations of the second aspect, the electronic device further includes a system side, and that the secure area obtains a fingerprint image and a multi-frame touch signal includes: The secure area receives indication information and obtains the fingerprint image and the multi-frame touch signal from a storage location based on the indication information, where the indication information is used to indicate the storage location, and the storage location stores the fingerprint image and the multi-frame touch signal; or the secure area receives the fingerprint image and the multi-frame touch signal that are sent by the system side.

In some possible implementations, the system side is a rich execution environment REE.

With reference to the second aspect, in some implementations of the second aspect, the multi-frame touch signal includes: a multi-frame touch signal collected synchronously when the fingerprint image is collected; or a multi-frame touch signal collected synchronously when the fingerprint image is collected, and a multi-frame touch signal buffered before the fingerprint image is obtained.

With reference to the second aspect, in some implementations of the second aspect, the fingerprint image is a non-first fingerprint image, and the touch signal is a multi-frame touch signal synchronously collected when the first fingerprint image is collected.

With reference to the second aspect, in some implementations of the second aspect, after the secure area obtains the fingerprint image and the multi-frame touch signal, the method further includes: The secure area preprocesses the multi-frame touch signal based on a screen status or a touch collection frequency of the electronic device, where the preprocessing includes one or more of interpolation processing, zero padding processing, and downsampling processing.

With reference to the second aspect, in some implementations of the second aspect, after the secure area obtains the fingerprint image and the multi-frame touch signal, the method further includes: The secure area obtains, through truncation, a touch signal with a predetermined frame quantity or a predetermined size.

With reference to the second aspect, in some implementations of the second aspect, the secure area stores a multi-modal network, and the multi-modal network includes a fingerprint image subnetwork and a touch signal subnetwork. That the secure area determines that the fingerprint image is a fingerprint image of a real finger or a fingerprint image of a fake finger includes: The secure area inputs the fingerprint image into the fingerprint image subnetwork for processing, to obtain a first eigenvector; the secure area inputs the touch signal into the touch signal subnetwork for processing, to obtain a second eigenvector; the secure area fuses the first eigenvector with the second eigenvector to obtain a third eigenvector; the secure area classifies the third eigenvector to obtain a classification result; and the secure area determines, based on the classification result, that the fingerprint image is a fingerprint image of a real finger or a fingerprint image of a fake finger.

With reference to the second aspect, in some implementations of the second aspect, that the secure area determines, based on the classification result, that the fingerprint image is a fingerprint image of a real finger or a fingerprint image of a fake finger includes: If the classification result includes a first confidence, and the first confidence is greater than or equal to a first threshold, the secure area determines that the fingerprint image is a fingerprint image of a real finger, where the first confidence is a confidence at which the fingerprint image is a fingerprint image of a real finger; or if the classification result includes a second confidence, and the second confidence is greater than or equal to a second threshold, the secure area determines that the fingerprint image is a fingerprint image of a fake finger, where the second confidence is a confidence at which the fingerprint image is a fingerprint image of a fake finger. The first threshold and the second threshold are adjustable.

With reference to the second aspect, in some implementations of the second aspect, the method further includes: Before inputting the fingerprint image and the touch signal into the multi-modal network, the secure area fuses the fingerprint image with the touch signal; and after inputting the fingerprint image and the touch signal into the multi-modal network, the secure area separates the fingerprint image and the touch signal.

With reference to the second aspect, in some implementations of the second aspect, after the secure area obtains the fingerprint image and the multi-frame touch signal, the method further includes: The secure area performs normalization processing on the fingerprint image and the touch signal.

In some possible implementations, that the secure area performs normalization processing on the fingerprint image and the touch signal includes: The secure area normalizes element values of data corresponding to the fingerprint image to be in a first range; and the secure area normalizes element values of data corresponding to the touch signal to be in a second range.

In some possible implementations, the first range is the same as the second range.

With reference to the second aspect, in some implementations of the second aspect, when the secure area determines that the fingerprint image is a fingerprint image of a fake finger, the method further includes: The electronic device sends fake fingerprint prompt information to a user; or the electronic device sends operation failure prompt information to a user.

With reference to the second aspect, in some implementations of the second aspect, when the electronic device determines that the fingerprint image is a fingerprint image of a real finger, the method further includes: The secure area determines that the fingerprint image matches a fingerprint image preset by a user; and the electronic device determines that user identity authentication succeeds.

With reference to the second aspect, in some implementations of the second aspect, the multi-frame touch signal is used to represent one or more of touch strength, a touch strength change trend, a touch shape, and a touch shape change trend.

According to a third aspect, the technical solutions provide a fingerprint anti-counterfeiting apparatus, and the apparatus is included in an electronic device. The apparatus has a function of implementing behavior of the electronic device in the first aspect and the possible implementations of the first aspect. The function may be implemented by hardware, or may be implemented by hardware executing corresponding software. The hardware or the software includes one or more modules or units corresponding to the foregoing function.

According to a fourth aspect, the technical solutions provide a fingerprint anti-counterfeiting apparatus, and the apparatus is included in an electronic device. The apparatus has a function of implementing behavior of the electronic device in the second aspect and the possible implementations of the second aspect. The function may be implemented by hardware, or may be implemented by hardware executing corresponding software. The hardware or the software includes one or more modules or units corresponding to the foregoing function.

According to a fifth aspect, the technical solutions provide an electronic device, including one or more processors, a memory, a plurality of applications, and one or more computer programs. The one or more computer programs are stored in the memory. The one or more computer programs include instructions. When the instructions are executed, the electronic device is enabled to perform the fingerprint anti-counterfeiting method in any possible implementation of the first aspect.

According to a sixth aspect, the technical solutions provide an electronic device, including one or more processors, a memory, a plurality of applications, and one or more computer programs. The one or more computer programs are stored in the memory. The one or more computer programs include instructions. When the instructions are executed, the electronic device is enabled to perform the fingerprint anti-counterfeiting method in any possible implementation of the second aspect.

According to a seventh aspect, the technical solutions provide an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the fingerprint anti-counterfeiting method in any possible implementation of the first aspect.

According to an eighth aspect, the technical solutions provide an electronic device, including one or more processors and one or more memories. The one or more memories are coupled to one or more processors. The one or more memories are configured to store computer program code. The computer program code includes computer instructions, and when the one or more processors execute the computer instructions, the electronic device is enabled to perform the fingerprint anti-counterfeiting method in any possible implementation of the second aspect.

According to a ninth aspect, the technical solutions provide a computer storage medium, including computer instructions. When the computer instructions are run on an electronic device, the electronic device is enabled to perform the fingerprint anti-counterfeiting method in any possible implementation of the first aspect or the second aspect.

According to a tenth aspect, the technical solutions provide a computer program product. When the computer program product is run on an electronic device, the electronic device is enabled to perform the fingerprint anti-counterfeiting method in any possible design of the first aspect or the second aspect.

According to an eleventh aspect, a chip system is provided. The chip system includes at least one processor, at least one memory, and an interface circuit. The interface circuit is responsible for information exchange between the chip system and an external environment. The at least one memory, the interface circuit, and the at least one processor are interconnected through lines. The at least one memory stores instructions. The instructions are executed by the at least one processor, to perform an operation of the electronic device in the method according to the first aspect.

DETAILED DESCRIPTION OF ILLUSTRATIVE EMBODIMENTS

Terms used in the following embodiments are merely intended to describe particular embodiments, but are not intended to limit this application. Terms "one", "a", "the", "the foregoing", and "this" of singular forms used in this specification and the appended claims of this application are also intended to include plural forms such as "one or more", unless otherwise specified in the context clearly. It should be further understood that, in the following embodiments of this application, "at least one" or "one or more" means one, two, or more. The term "and/or" is used to describe an association of associated objects and represents that three relationships may exist. For example, A and/or B may represent the following three cases: Only A exists, both A and B exist, and only B exists, where A and B may be singular or plural. The character "/" usually represents an "or" relationship between the associated objects.

Reference to "an embodiment", "some embodiments", or the like described in this specification indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment, instead, they mean "one or more but not all of the embodiments", unless otherwise specifically emphasized. The terms "include", "comprise", "have", and their variants all mean "include but are not limited to", unless otherwise specifically emphasized.

An electronic device, a user interface used for such an electronic device, and an embodiment used for such an electronic device are described below. In some embodiments, the electronic device may be a portable electronic device that further includes another function such as a personal digital assistant function and/or a music player function, for example, a mobile phone, a tablet computer, or a wearable electronic device (for example, a smartwatch) having a wireless communication function. An example embodiment of the portable electronic device includes but is not limited to a portable electronic device provided with iOS®, Android®, Microsoft®, or another operating system. The portable electronic device may alternatively be another portable electronic device, such as a laptop (Laptop). It should be further understood that, in some other embodiments, the foregoing electronic device may not be the portable electronic device but a desktop computer.

Figure 1:
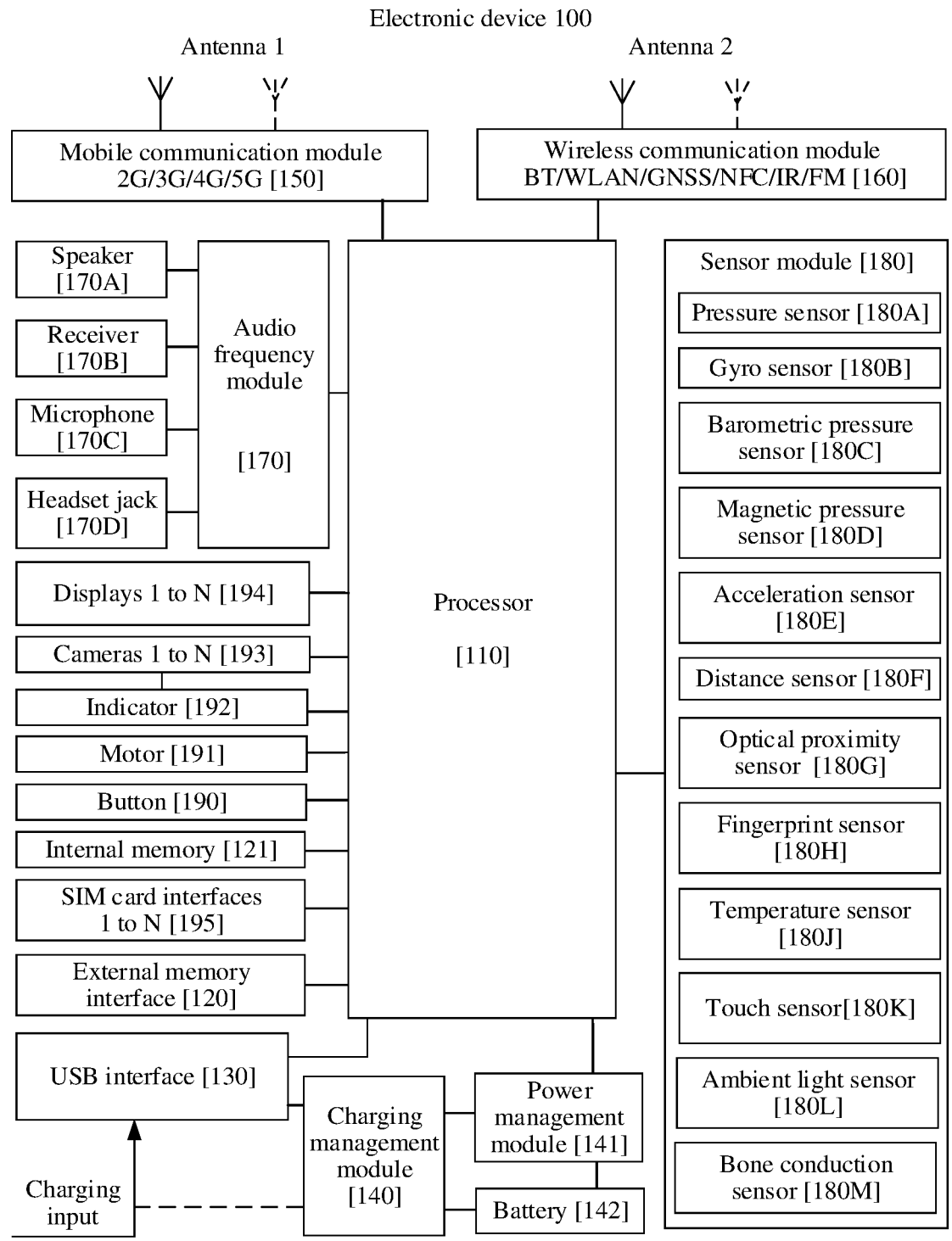
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

It may be understood that the structure shown in this embodiment of this application does not constitute a specific limitation on the electronic device 100. In some other embodiments of this application, the electronic device 100 may include more or fewer components than those shown in the figure, or may combine some components, or may split some components, or may have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the electronic device 101 may alternatively include one or more processors 110. The controller may generate an operation control signal based on instruction operation code and a time sequence signal, to complete control of instruction fetching and instruction execution. In some other embodiments, a memory may further be disposed in the processor 110, to store instructions and data. For example, the memory in the processor 110 may be a cache. The memory may store instructions or data just used or cyclically used by the processor 110. If the processor 110 needs to use the instructions or the data again, the processor 110 may directly invoke the instructions or the data from the memory. In this way, repeated access is avoided, waiting time of the processor 110 is reduced, and efficiency of processing data or executing instructions by the electronic device 101 is improved.

In the embodiments of this application, actions of a client application (client application, CA) run in a rich execution environment (rich execution environment, REE) and a trusted application (trusted application, TA) run in a trusted execution environment (trusted execution environment, TEE) are all related to the processor 110. For specific action descriptions, refer to the following embodiments.

It should be understood that the REE is an open environment created for versatility and richness, executes an operating system (such as an Android OS or an iOS) of the electronic device, and opens downloading for a third-party server after the electronic device is produced.

It should be further understood that the TEE is a concept proposed by the organization GlobalPlatform (global platform, GP) for an REE of an electronic device, and is a running environment that coexists with but is isolated from the REE. Running a trusted operating system (trusted OS) can provide a security service for a rich operating system (rich OS). A combination of hardware and software can be used to ensure secure transmission, storage, and processing of sensitive data on the trusted OS, thereby ensuring confidentiality and integrity for TA execution and end-to-end security for data access permission. Because of its execution space, the trusted OS has a higher security level than the Rich OS, but has a lower security level than a secure element (secure element, SE).

A series of TAs run in the TEE, and unlike a common application in the REE, the TEE can provide, for these TAs, security services such as integrity for application execution, secure storage, secure interaction with an input/output device, key management, an encryption algorithm, and secure communication with the CA in the REE.

The TA is an application that runs in the TEE and can provide a security-related service for the CA in the REE or another TA in the TEE. The CA runs in the REE, and may invoke or access an application of the TA(s) in the TEE by using a TEE client application programming interface (TEE client application programming interface, TEE client API). The TEE client API may be an interface used by the REE to access the TEE.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB port, and/or the like. The USB port 130 is an interface that conforms to a USB standard specification, and may be specifically a mini USB port, a micro USB port, a USB Type-C port, or the like. The USB port 130 may be configured to connect to a charger to charge the electronic device 101, or may be configured to transmit data between the electronic device 101 and a peripheral device. The USB port 130 may alternatively be configured to connect to a headset, and play audio by using the headset.

It may be understood that an interface connection relationship between the modules illustrated in this embodiment of this application is merely used as an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive charging input from the charger. The charger may be a wireless charger or a wired charger. In some embodiments of wired charging, the charging management module 140 may receive charging input from a wired charger through the USB port 130. In some embodiments of wireless charging, the charging management module 140 may receive wireless charging input through a wireless charging coil of the electronic device 100. The charging management module 140 may further supply power to the electronic device by using the power management module 141 while charging the battery 142.

The power management module 141 is configured to connect the battery 142 and the charging management module 140 to the processor 110. The power management module 141 receives input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In some embodiments, the electronic device 100 may include one or more displays 194.

In some embodiments of this application, when the display panel is made of a material such as an OLED, an AMOLED, or an FLED, the display 194 in FIG. 1 may be bent. Herein, that the display 194 may be bent means that the display may be bent to any angle at any part, and may be held at the angle. For example, the display 194 may be folded left and right from the middle. Alternatively, the display 194 may be folded up and down from the middle. In this application, the display that may be bent is referred to as a foldable display. The touch display may be a screen, or may be a display formed by combining a plurality of screens. This is not limited herein.

The display 194 of the electronic device 100 may be a flexible screen. Currently, flexible screens have attracted attention due to their unique characteristics and great potential. Compared with a conventional screen, the flexible screen has features of strong flexibility and bendability, and can provide a user with a new interaction mode based on the feature of bendability, to meet more requirements of the user for an electronic device. For an electronic device configured with a foldable display, the foldable display on the electronic device may be switched between a small screen in a folded form and a large screen in an expanded form at any time. Therefore, the user uses a split-screen function more frequently on the electronic device configured with the foldable display.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to: compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store one or more computer programs, and the one or more computer programs include instructions. The processor 110 may run the instructions stored in the internal memory 121, so that the electronic device 101 performs the fingerprint anti-counterfeiting method provided in some embodiments of this application, various applications, data processing, and the like. The internal memory 121 may include a program storage area and a data storage area. The program storage area may store an operating system. The program storage area may further store one or more applications (such as Gallery and Contacts), and the like. The data storage area may store data (for example, a photo or a contact) created in a process of using the electronic device 101, and the like. In addition, the internal memory 121 may include a high-speed random access memory, or may include a nonvolatile memory, for example, one or more magnetic disk storage devices, a flash memory device, or a universal flash storage (universal flash storage, UFS). In some embodiments, the processor 110 may run the instructions stored in the internal memory 121 and/or the instructions stored in the memory that is disposed in the processor 110, to enable the electronic device 101 to perform the fingerprint anti-counterfeiting method provided in the embodiments of this application, other applications, and data processing. The electronic device 100 may implement audio functions, for example, music playing and recording, by using the audio module 170, the speaker 170A, the receiver 170B, the microphone 170C, the headset jack 170D, the application processor, and the like.

In the embodiments of this application, the internal memory or the external memory may store applications and user data. For a specific storage process, refer to the following embodiments.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating an SMS message is executed.

The gyro sensor 180B may be configured to determine a motion posture of the electronic device 100. In some embodiments, an angular velocity of the electronic device 100 around three axes (namely, axes X, Y, and Z) may be determined by using the gyro sensor 180B. The gyro sensor 180B may be configured to perform image stabilization during photographing. For example, when a shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The acceleration sensor 180E may detect magnitudes of accelerations of the electronic device 100 in various directions (usually on three axes), and may detect a magnitude and a direction of gravity when the electronic device 100 is still. The acceleration sensor 180E may be further configured to identify a posture of the electronic device, and is used in an application such as switching between landscape mode and portrait mode or a pedometer.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use the collected fingerprint image to implement fingerprint unlocking, application access locking, fingerprint-controlled photographing, fingerprint-controlled call answering, and the like.

In the embodiments of this application, an action of a fingerprint application on the electronic device, such as fingerprint image obtaining, is related to the fingerprint sensor.

The temperature sensor 180J is configured to detect a temperature. In some embodiments, the electronic device 100 executes a temperature processing policy based on the temperature detected by the temperature sensor 18J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as "touch panel". The touch sensor 180K may be arranged on the display 194, and a touchscreen includes the touch sensor 180K and the display 194. The touch sensor 180K is configured to detect a touch operation performed on or near the touch sensor 180K. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device 100 at a location different from that of the display 194.

The touchscreen (or touch control screen) may collect an operation action of touching or approaching the touchscreen by the user, such as an operation action performed by the user on the touch panel or at a position near the touch panel by using any appropriate object or accessory such as a finger or a stylus, and a corresponding connection apparatus is driven according to a preset program. Optionally, the touch panel may include two parts: a touch detection apparatus and a touch controller. The touch detection apparatus detects a touch operation performed by the user, converts the detected touch operation into an electrical signal, and transmits the electrical signal to the touch controller. The touch controller receives the electrical signal from the touch detection apparatus, converts the electrical signal into contact coordinates, and sends the contact coordinates to the processor 110. The touch controller may further receive and execute a command sent by the processor 110. In addition, the touch panel may be implemented in a plurality of types, such as a resistive type, a capacitive type, an infrared (infrared) type, and a surface acoustic wave type.

In the embodiments of this application, an action of a fingerprint application on the electronic device, such as touch signal obtaining, is related to the touch sensor.

The button 190 includes a power button, a volume button, and the like. The button 190 may be a mechanical button, or may be a touch button. The electronic device 100 may receive a key input, and generate key signal input related to a user setting and function control of the electronic device 100.

FIG. 2(*a*) to FIG. 2(*d*) show a group of graphical user interfaces (graphical user interface, GUI) of a mobile phone, and FIG. 2(*a*) to FIG. 2(*d*) show a process in which a user performs fingerprint unlocking.

As shown in FIG. 2(*a*), the GUI is a screen locked interface of the mobile phone. The screen locked interface includes a touchscreen 201 and a fingerprint unlocking area 202. The fingerprint unlocking area 202 is configured to detect a fingerprint input by the user.

It should be understood that, in this embodiment of this application, a screen locking status may be a case in which locking is enabled on the electronic device, and the case in which locking is enabled on the electronic device includes but is not limited to: a password, fingerprint matching recognition, face matching recognition, or the like set by the user. For example, when locking is enabled on the electronic device, after completing an operation on a desktop of the electronic device, the user may press a power button. After detecting an operation of pressing the power button by the user, the electronic device enters a screen locked state.

Alternatively, if no user operation has been detected for a period of time, the electronic device automatically enters the screen locked state. When the electronic device is in the screen locked state, a screen of the electronic device may be off or on. For example, after the user presses the power button, the electronic device may turn on the screen and prompt the user to enter a password. In this case, the electronic device is still in the screen locked state, but a touch display of the electronic device is on. For example, after another user enters an incorrect password, the electronic device is still in the screen locked state in this case, but the touch display of the electronic device is still on.

It should be further understood that the fingerprint unlocking area 202 in this embodiment of this application may be located on the touchscreen 201, or may be located on a side or the back of the mobile phone. This is not limited in this embodiment of this application.

In this embodiment of this application, fingerprint matching recognition is used as an example for description.

Refer to FIG. 2(*b*). After the mobile phone detects a touch operation performed by the user in the fingerprint unlocking area 202, a fingerprint sensor of the mobile phone may collect a fingerprint image of the user, and a touch sensor of the mobile phone may collect a touch signal. The mobile phone may determine, based on the collected fingerprint image and touch signal, whether the fingerprint is live (or whether the fingerprint is a fingerprint of a live finger).

Refer to FIG. 2(*c*); when the mobile phone determines that the fingerprint is not a fingerprint of a live finger, the mobile phone may remind the user of "Unlocking failed" by using a reminder window 203 on the touchscreen. Alternatively, refer to FIG. 2(*d*); when the mobile phone determines that the fingerprint is not a fingerprint of a live finger, the mobile phone may remind the user of "Fake fingerprint detected" by using a reminder window 204 on the touchscreen.

In an embodiment, after the mobile phone reminds the user of "Fingerprint unlocking failed" or "Fake fingerprint detected", the mobile phone may display a password input interface, to allow the user to perform unlocking by entering a password.

In an embodiment, when the mobile phone determines that the fingerprint is a fingerprint of a live finger, the touchscreen of the mobile phone may display the desktop of the mobile phone.

The foregoing FIG. 2(*a*) to FIG. 2(*d*) describe a process in which the mobile phone, in a screen-on state, determines a real fingerprint or a fake fingerprint by collecting the fingerprint image and the touch signal after detecting the operation of the user in the fingerprint unlocking area 202. The following describes, with reference to FIG. 3(*a*) to FIG. 3(*d*), schematic diagrams in which a mobile phone, in a screen-off state, determines a real fingerprint and a fake fingerprint after detecting a touch operation of a user in a fingerprint unlocking area 202.

Refer to a GUI shown in FIG. 3(*a*). The GUI is an interface when the mobile phone is in the screen-off state.

It should be understood that, in this embodiment of this application, screen locked states of the mobile phone may be classified into a screen-on state and the screen-off state. The GUI shown FIG. 2(*a*) may be in the screen-on state in the screen locked states of the mobile phone, and certainly, may alternatively be a screen-on state in another service operation (such as payment) process. The GUI shown in FIG. 3(*a*) may be in the screen-off state in the screen locked states of the mobile phone.

Refer to FIG. 3(*b*). After the mobile phone detects a touch operation of the user in the fingerprint unlocking area 202, a fingerprint sensor of the mobile phone may collect a fingerprint image and a touch signal, so as to determine whether the fingerprint image is a fingerprint image of a live finger.

In an embodiment, a touch signal collected by the mobile phone in the screen-off state may be different from a touch signal collected by the mobile phone in the screen-on state. For example, the mobile phone may perform collection by using a first collection frequency in the screen-on state, and perform collection by using a second collection frequency in the screen-off state. The first collection frequency may be different from the second collection frequency. Within a unit time, a quantity of frames of touch signals collected in the screen-on state may be different from a quantity of frames of touch signals collected in the screen-off state. After collecting the touch signal in the screen-off state, the mobile phone may first preprocess the touch signal, and then determine, based on the fingerprint image and a preprocessed touch signal, whether a finger is live (or whether the fingerprint is a fingerprint of a live finger). The following embodiments describe in detail a process in which the electronic device performs preprocessing on the touch signal based on a screen status.

Refer to FIG. 3(*c*); when the mobile phone determines that the fingerprint is not a fingerprint of a live finger, the mobile phone may remind the user of "Fingerprint unlocking failed" by using a reminder window 301 on a touchscreen. Alternatively, refer to FIG. 3(*d*); when the mobile phone determines that the fingerprint is not a fingerprint of a live finger, the mobile phone may remind the user of "Fake fingerprint detected" by using a reminder window 302 on a touchscreen.

In an embodiment, after the mobile phone reminds the user of "Fingerprint unlocking failed" or "Fake fingerprint detected", the mobile phone may display a password input interface, to allow the user to perform unlocking by entering a password.

In an embodiment, when the mobile phone determines that the fingerprint is a fingerprint of a live finger, the touchscreen of the mobile phone may display a desktop of the mobile phone.

It should be noted that, in the embodiments of this application, "the fingerprint is not live" or "the fingerprint is not a fingerprint of a live finger" may be understood as that the user places a 2D or 3D fake fingerprint on the fingerprint unlocking area 202 to press, so as to attempt to perform fingerprint matching to unlock the mobile phone, and so on. The 2D fake fingerprint is a fake fingerprint made by using a real finger as a template and using a material such as ink paste or carbon powder. The 3D fake fingerprint is a fake fingerprint made by using a material such as silicone or emulsion. A specific manufacturing method is not described herein.

FIG. 4(*a*) to FIG. 4(*d*) show another group of GUIs of a mobile phone. FIG. 4(*a*) to FIG. 4(*d*) show a process in which a user performs transfer by using the mobile phone.

Refer to a GUI shown in FIG. 4(*a*). The GUI is a payment interface of a specific application (application, APP) of the mobile phone. After detecting an operation of tapping a control 401 by a user, the mobile phone displays an interface shown in FIG. 4(*b*).

Refer to a GUI shown in FIG. 4(*b*). After detecting an operation of tapping the control 401 by the user, the mobile phone may display a reminder window 402. The reminder window 402 reminds the user of "Please enter your fingerprint" by using a text.

After the mobile phone detects a touch operation performed by the user in the fingerprint unlocking area, a fingerprint sensor of the mobile phone may collect a fingerprint image of the user, and a touch sensor of the mobile phone may collect a touch signal. The mobile phone may determine, based on the collected fingerprint image and touch signal, whether the fingerprint is a fingerprint of a live finger.

Refer to FIG. 4(*c*); when the mobile phone determines that the fingerprint is not a fingerprint of a live finger, the mobile phone may remind the user of "Transfer failed" by using a reminder window 403 on a touchscreen. Alternatively, refer to FIG. 2(d); when the mobile phone determines that the fingerprint is not a fingerprint of a live finger, the mobile phone may remind the user of "Fake fingerprint detected" by using a reminder window 404 on a touchscreen.

In an embodiment, after the mobile phone reminds the user of "Transfer failed" or "Fake fingerprint detected", the mobile phone may display a password input interface, to allow the user to perform a transfer operation by entering a password.

In an embodiment, when the mobile phone determines that the fingerprint is a fingerprint of a live finger, the mobile phone may perform the transfer operation, and send, to the user after the transfer succeeds, a reminder indicating that the transfer succeeds.

Figure 5:
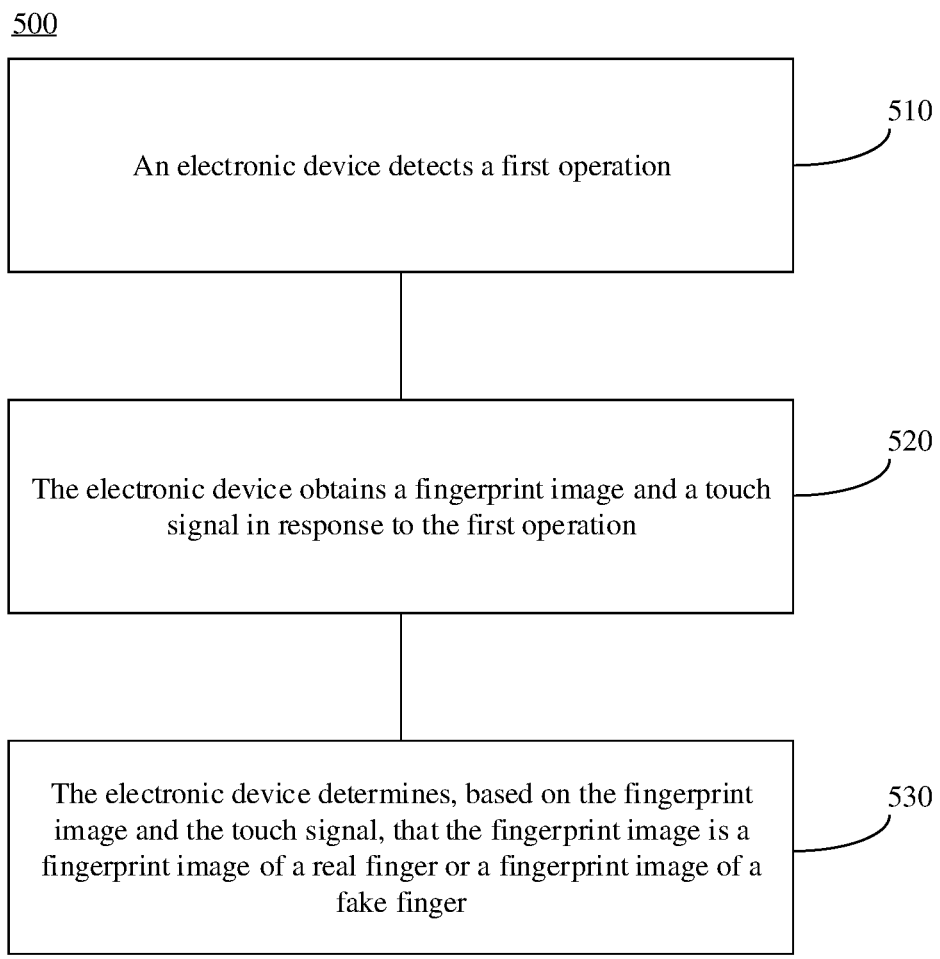
FIG. 5 is a schematic flowchart of a fingerprint anti-counterfeiting method according to an embodiment of this application.

FIG. 5 is a schematic flowchart of a fingerprint anti-counterfeiting method 500 according to an embodiment of this application. As shown in FIG. 5, the method 500 includes the following steps.

S510. An electronic device detects a first operation.

In an embodiment, the first operation includes but is not limited to an operation, performed by a user, of touching, pressing, or approaching, at a preset distance, a device such as a screen or a power button of the electronic device, so that the electronic device can trigger collection of a fingerprint image and a multi-frame touch signal after sensing the operation.

It should be understood that, "multi-frame" in the "multi-frame touch signal" in this embodiment of this application may mean that there are a plurality of frames of collected touch signals. For example, in FIG. 2(a) to FIG. 4(d), there may be a plurality of frames of touch signals collected by a touch sensor of a mobile phone.

Figure 2A:
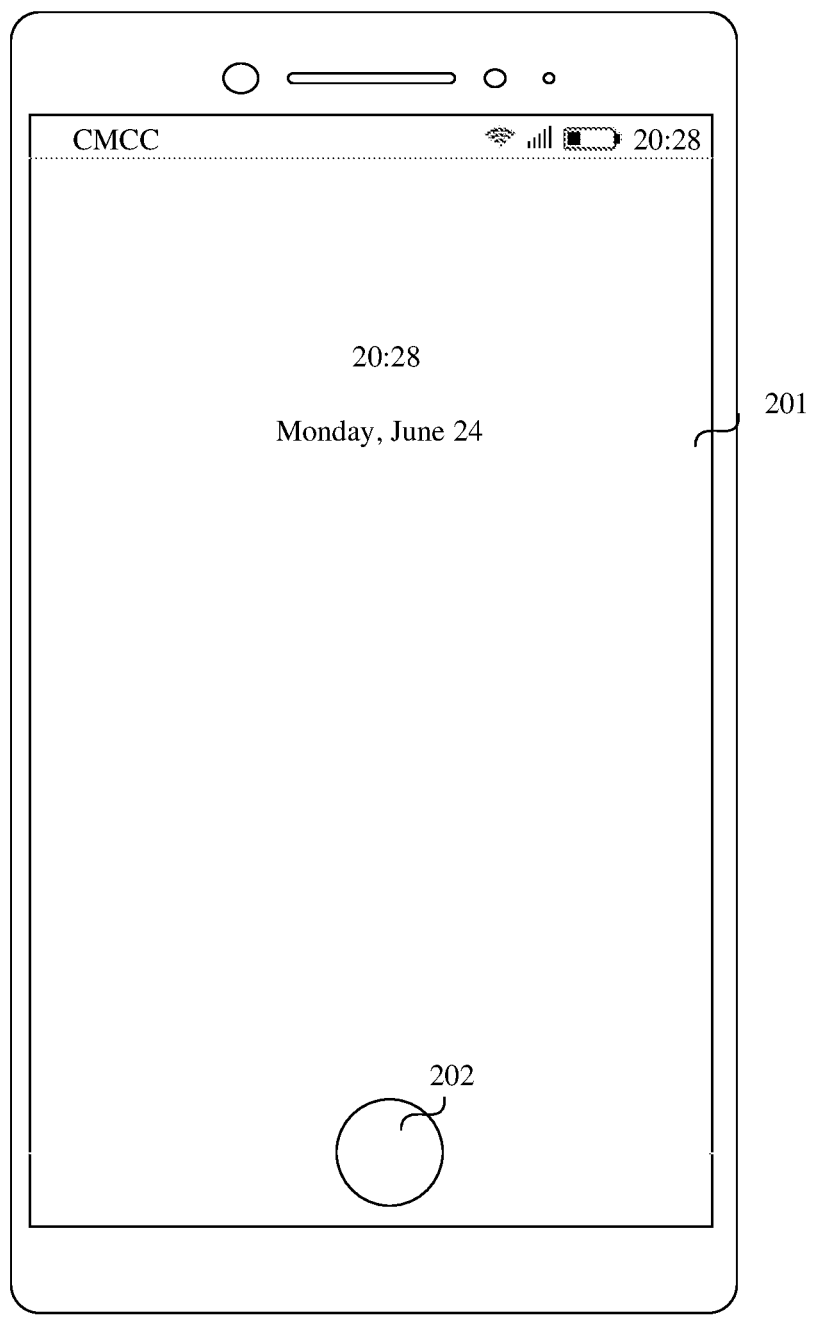
FIG. 2(a) to FIG. 2(d) are a group of GUIs according to an embodiment of this application.
Figure 2B:
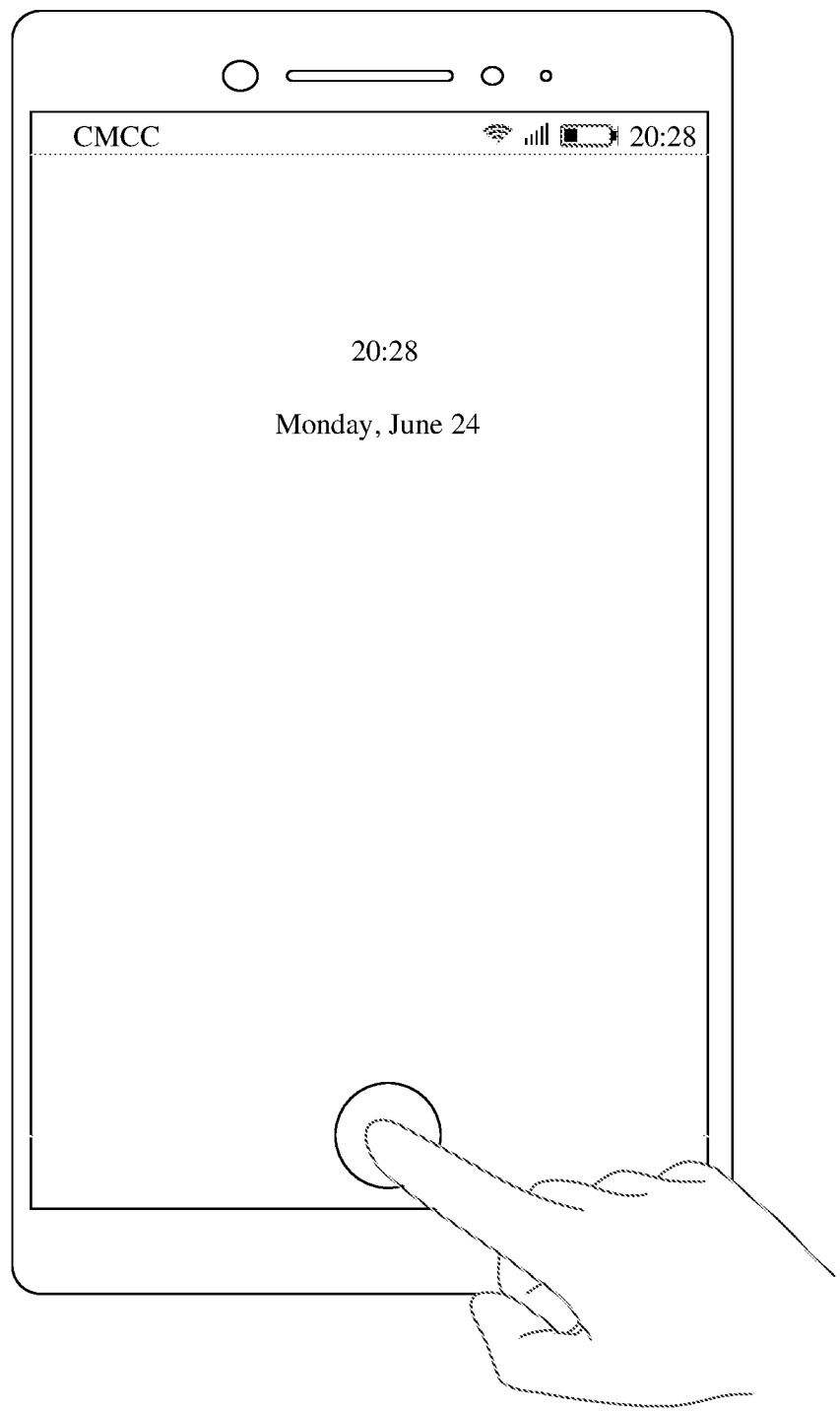
Figure 2C:
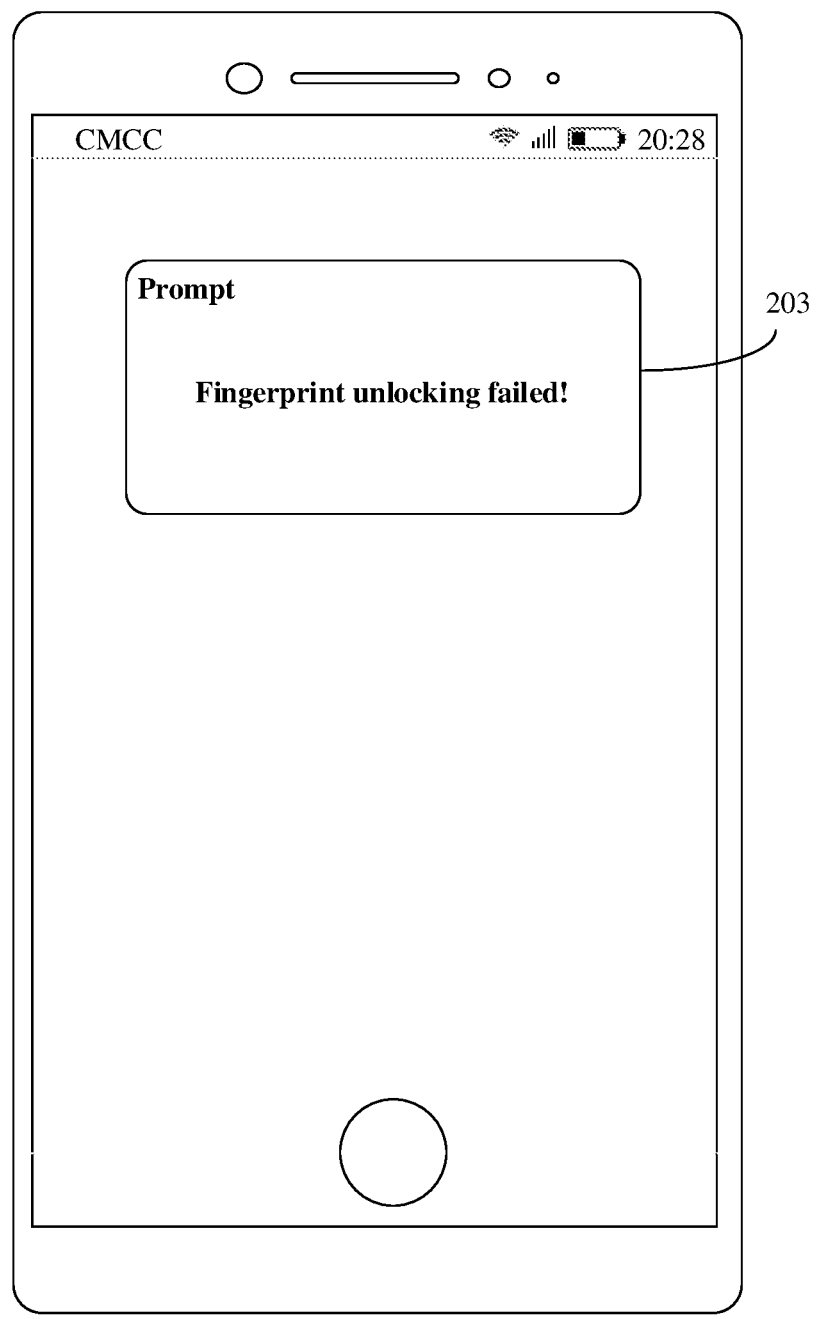
Figure 2D:
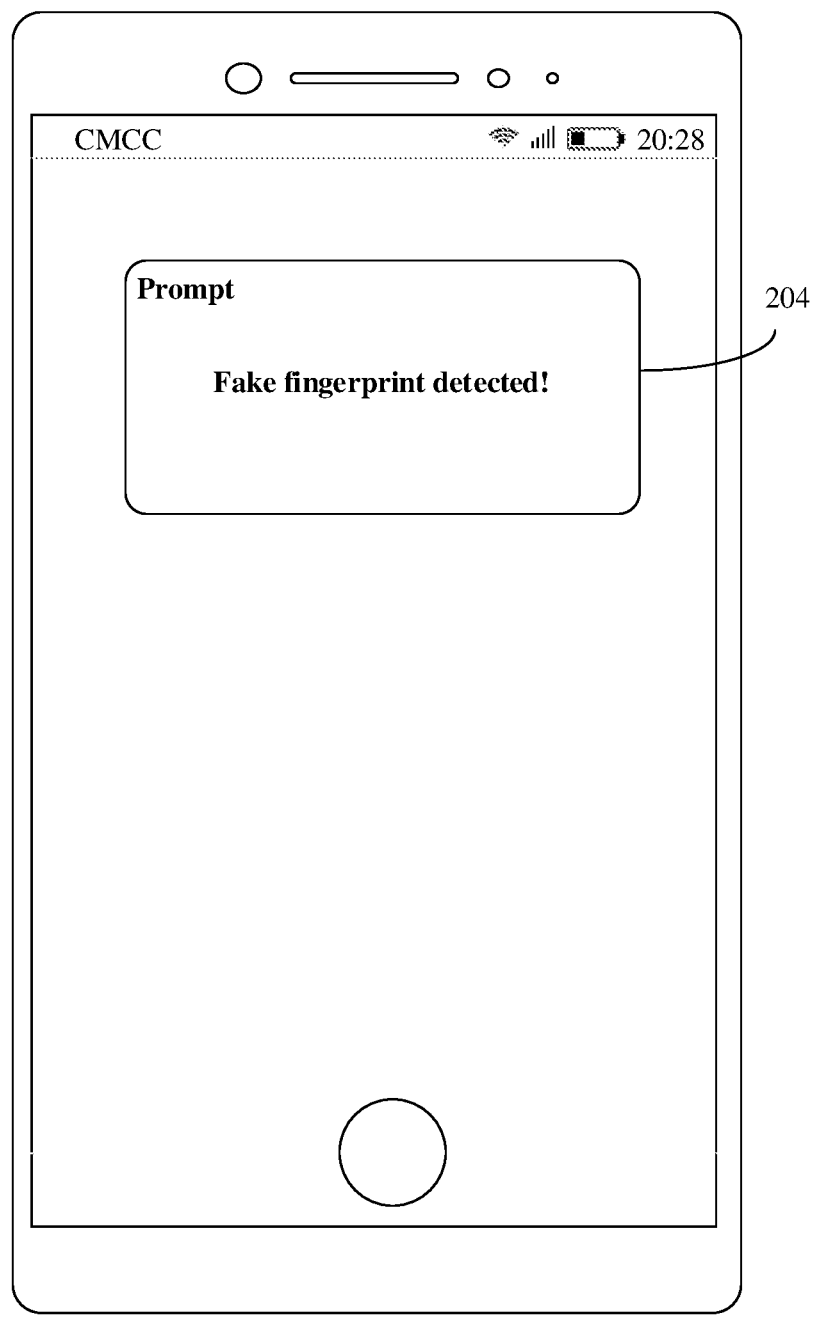
Figure 3A:
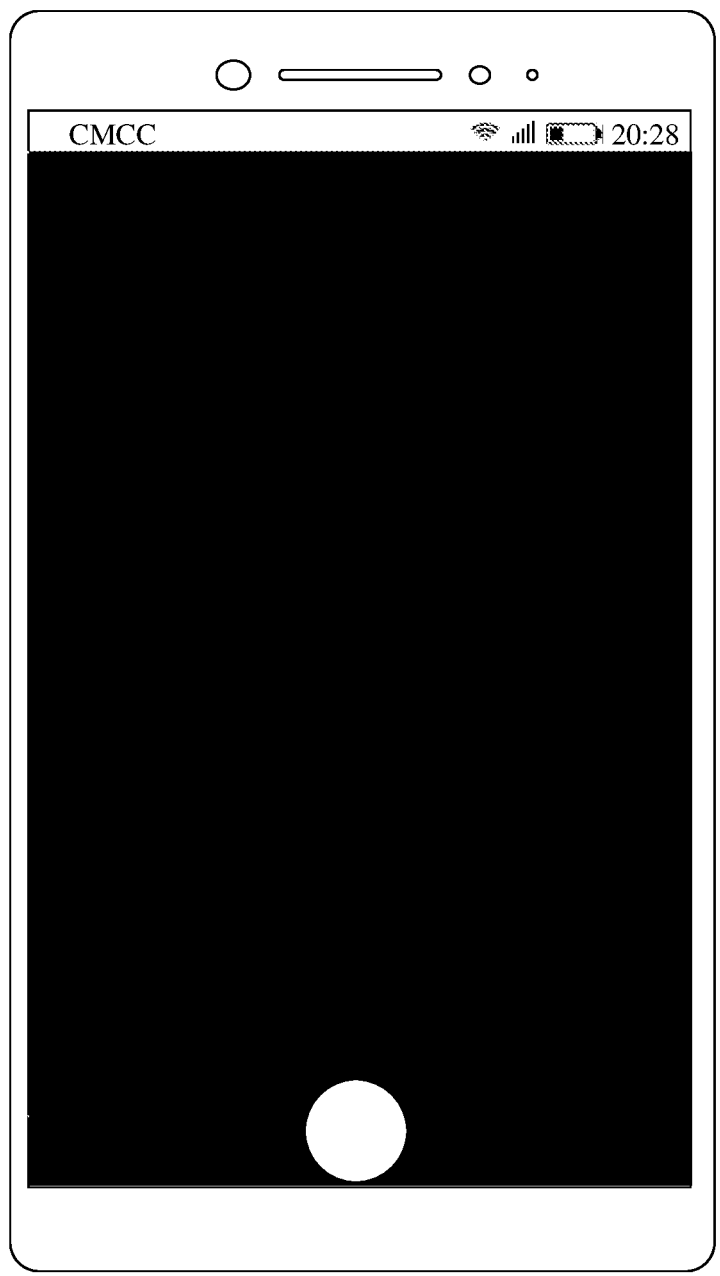
FIG. 3(a) to FIG. 3(d) are another group of GUIs according to an embodiment of this application.
Figure 3B:
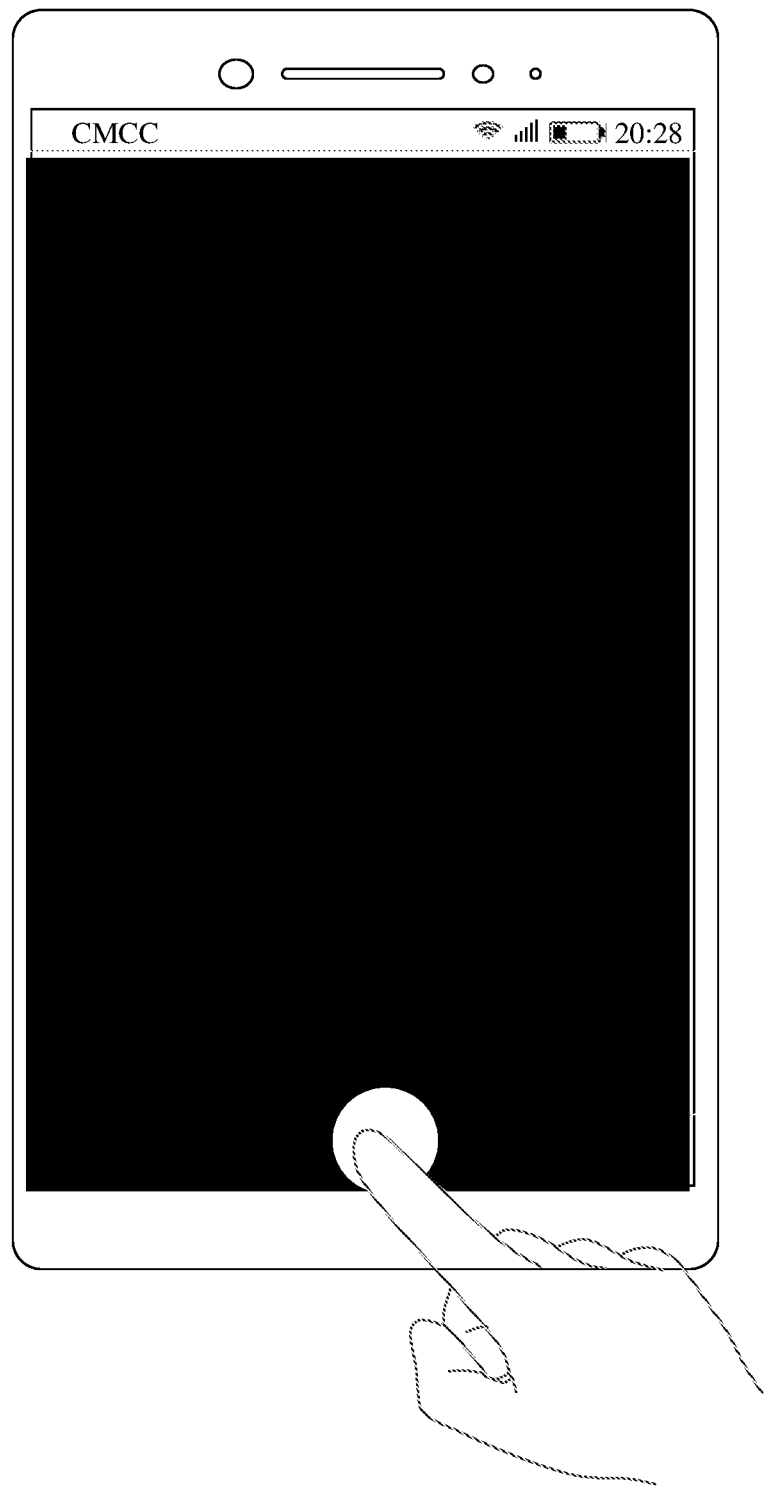
Figure 3C:
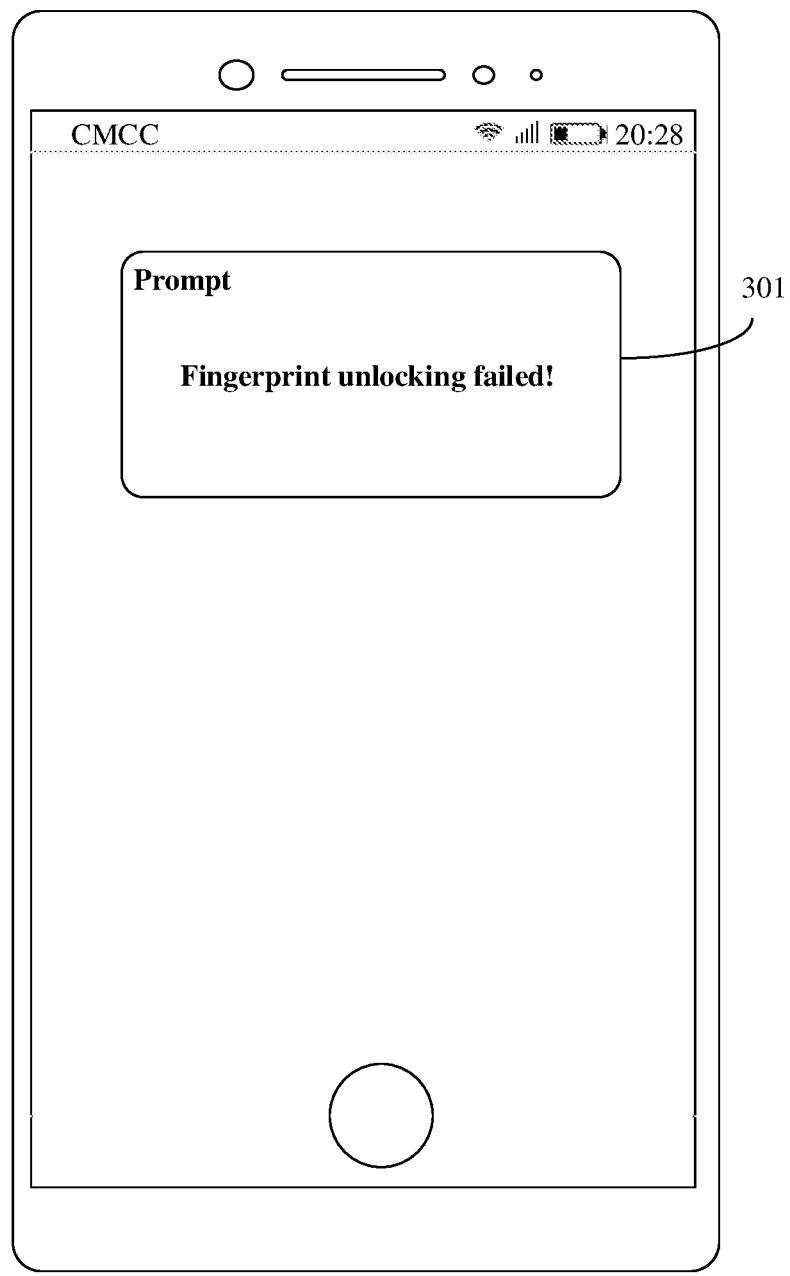
Figure 3D:
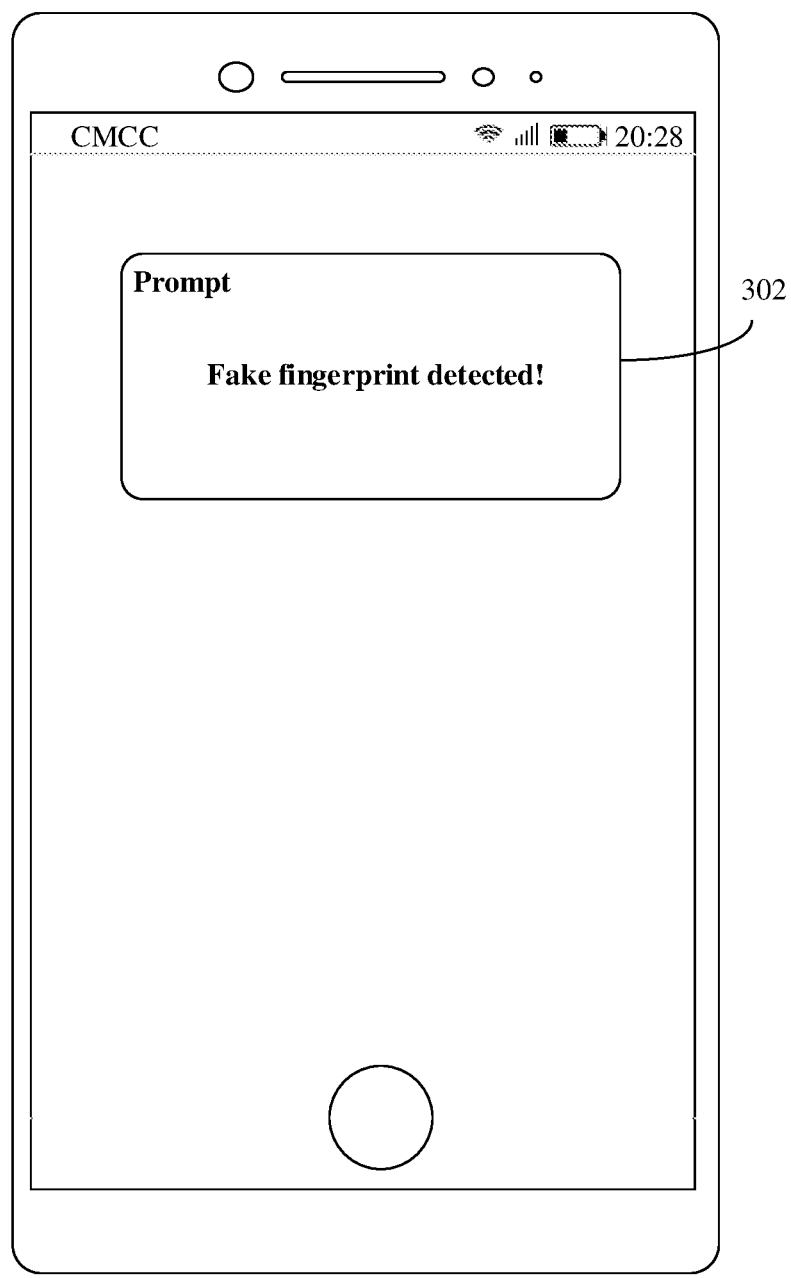

For example, as shown in FIG. 2(b) or FIG. 3(b), the first operation may be a touch or pressing operation performed by the user on a fingerprint unlocking area 202.

S520. The electronic device obtains a fingerprint image and a touch signal in response to the first operation.

The touch signal may be used to represent strength of a touch signal, a strength change trend of a touch signal, a fingerprint touch shape, a change trend of a fingerprint touch shape, press deformation, a change trend of press deformation, and the like.

For example, as shown in FIG. 1, after generating a fingerprint interrupt based on the first operation of the user, an electronic device 100 triggers a fingerprint sensor 180H to collect a fingerprint image and triggers a touch sensor 180K to collect a touch signal after detecting the first operation of the user.

It should be understood that, that the touch sensor 180K collects a touch signal may be: a specific entity on the electronic device (for example, a module that is on a system side and that is responsible for sensor management, or another module with a similar function) notifies the touch sensor to start collecting a touch signal. The touch signal includes at least one frame of touch signal. In other words, one fingerprint image corresponds to at least one frame of touch signal.

In this embodiment of this application, manners in which the electronic device obtains a touch signal include but are not limited to the following several manners:

Manner 1

The system side of the electronic device obtains the touch signal, and directly sends the touch signal to a secure area (more specifically, a fingerprint application of the secure area) of the electronic device.

The secure area herein may be a TEE with a relatively high security level. The fingerprint application of the secure area may be a TA in the TEE. The system side may be an REE with a relatively low security level.

It should be noted that the system side of the electronic device obtains the touch signal and sends it to another area after the fingerprint image and the touch signal are collected.

Manner 2

The system side of the electronic device sends, to a secure area, related information used by the secure area to obtain the touch signal. For example, after the touch sensor collects the touch signal and stores the touch signal into a specific storage area, the system side sends related information (such as a storage location) of the specific storage area to the secure area, so that the secure area (more specifically, a fingerprint application in the secure area) reads the touch signal from the specific memory area.

Manner 3

The system side of the electronic device directly sends an instruction for obtaining the touch signal to a secure area, and the secure area directly obtains the touch signal collected by the touch sensor.

It should be understood that, in Manner 1 to Manner 3, another function module in the electronic device may alternatively implement the foregoing actions of the system side. This is not limited in this embodiment of this application.

It should be further understood that manners of obtaining a fingerprint image by the electronic device are similar to the manners of obtaining a touch signal. For brevity, details are not described herein again.

It should be further understood that, a specific implementation in which the electronic device obtains the fingerprint image and the touch signal may be: obtaining the fingerprint image and the touch signal together in any one of the foregoing manners, or obtaining the fingerprint image separately in any one of the foregoing manners and obtaining the touch signal separately in any one of the foregoing manners.

It should be further understood that, in this embodiment of this application, the system side may first obtain the fingerprint image and the touch signal collected by the sensor, and then send the fingerprint image and the touch signal to the secure area (more specifically, the fingerprint application of the secure area); or send related information (such as storage locations) of the fingerprint image and the touch signal to the secure area. Alternatively, another function module of the electronic device may obtain the fingerprint image and the touch signal collected by the sensor, and then send the fingerprint image and the touch signal to the secure area; or send related information of the fingerprint image and the touch signal to the secure area. In this embodiment of this application, no limitation is imposed on a location from which the secure area obtains the touch signal or the fingerprint image or on the related information of the fingerprint image and the touch signal.

It should be further understood that, in this embodiment of this application, that the electronic device obtains the fingerprint image and the touch signal may include: The fingerprint image and the touch signal are collected respectively by using the fingerprint sensor and the touch sensor as described above, or may include: The fingerprint image and the touch signal or the related information of the fingerprint image and the touch signal is sent to the secure area as described above, so as to facilitate subsequent processing by the fingerprint application. In a specific implementation of collecting the fingerprint image and the touch signal, after detecting that a finger presses the fingerprint sensor, the electronic device may simultaneously trigger the two sensors to synchronously collect the fingerprint image and the touch signal. However, before this, the electronic device may further detect another touch interrupt event such as pressing the screen (a position other than the fingerprint sensor), hovering over the screen at a specific distance, or pressing the power button by the finger, so that the touch sensor collects touch signals. The collected touch signals are buffered in the electronic device for temporary storage. When buffer space is full, an earliest touch signal is cleared, and a latest collected touch signal is stored. The touch signal stored in the buffer space may be used in the subsequent step S530 to form a touch signal sequence together with a touch signal collected synchronously each time a fingerprint image is collected. Certainly, the buffered touch signal may alternatively be not used.

S530. The electronic device determines, based on the fingerprint image and the touch signal, that the fingerprint image is a fingerprint image of a real finger or a fingerprint image of a fake finger.

In an embodiment, the electronic device may determine, based on a multi-modal network, whether the fingerprint image and the touch signal both match a press feature of a fake fingerprint or a real fingerprint.

For example, the electronic device makes a fingerprint image and a touch signal form a to-be-determined sample pair. When determining that a degree of matching between a feature of the to-be-determined sample pair and a feature of a fake fingerprint is greater than or equal to a first threshold, the electronic device determines that the fingerprint image is a fingerprint image of a fake finger, or determines that the fingerprint image is not a fingerprint image of a live finger. The multi-modal network may be a network obtained through training based on deep learning (for example, a convolutional neural network (convolutional neural networks, CNN)) by using a large quantity of determined sample pairs with a same distribution. The feature of the determined sample pair or the feature of the fake fingerprint described above may be a feature set obtained based on a neural network, and may be understood as a multi-dimensional eigenvector. In other words, the to-be-determined sample pair or the fake fingerprint is mapped onto a multi-dimensional feature space for representation.

It should be understood that, the first threshold may be understood as a confidence. That the electronic device determines that a degree of matching between a feature of the to-be-determined sample pair and a feature of a fake fingerprint is greater than or equal to a first threshold may also be understood as: When the electronic device determines that a confidence at which the fingerprint image is a fingerprint image of a fake finger is greater than or equal to the first threshold, the electronic device determines that the fingerprint image is a fingerprint image of a fake finger, or determines that the fingerprint image is not a fingerprint image of a live finger.

It should be further understood that the first threshold is adjustable. A specific implementation is as follows: For example, the electronic device determines a value of the first threshold and the like based on a screen status or other information (such as fingerprint image quality and touch signal strength) of the electronic device. Certainly, the first threshold may alternatively be a fixed preset value.

For example, when determining that a degree of matching between a feature of the fingerprint image and a feature of a fingerprint image of the fake fingerprint is greater than or equal to a second threshold, and a degree of matching between a feature (such as a strength or a strength trend change) of the touch signal and a feature of a touch signal corresponding to the fake fingerprint is greater than or equal to a third threshold, the electronic device determines that the fingerprint image is a fingerprint image of a fake finger, or determines that the fingerprint image is not a fingerprint image of a live finger. The multi-modal network is a network including a fingerprint image subnetwork obtained through training by using a large quantity of fingerprint images and a touch signal subnetwork obtained through training by using a large quantity of touch signals. The feature of the fingerprint image or the feature of the touch signal (of the fake fingerprint) described above may be a feature set obtained based on a neural network, and may be understood as a multi-dimensional eigenvector. In other words, the fingerprint image or the touch signal (of the fake fingerprint) is mapped onto a multi-dimensional feature space for representation.

It should be understood that, in the foregoing example, the determining is performed by using a threshold corresponding to a fake fingerprint as a reference. Certainly, the determining may alternatively be performed by using a threshold corresponding to a real fingerprint as a reference. This is not limited in this embodiment of this application.

In an embodiment, if the electronic device determines that the fingerprint image is a fingerprint image of a fake finger, the electronic device sends user identity authentication failure information or fake fingerprint prompt information to the user.

It should be understood that a user identity authentication (fingerprint authentication) process includes two processes: fingerprint matching and fingerprint anti-counterfeiting. The foregoing method 500 is described mainly for the fingerprint anti-counterfeiting process. The fingerprint matching process means that matching is performed between the obtained fingerprint image and a fingerprint image of the user stored in the electronic device, and if the matching succeeds, it may be determined that the fingerprint is a fingerprint of the user. The fingerprint anti-counterfeiting means that the electronic device determines whether the fingerprint is a live fingerprint or a fake fingerprint (a 3D fake fingerprint or a 2D fake fingerprint).

For example, when the electronic device determines that the obtained fingerprint image matches the fingerprint image of the user stored in the electronic device, and the electronic device determines that the degree of matching between the feature of the to-be-determined sample pair and the feature of the fake fingerprint is greater than or equal to the first threshold, the electronic device may determine that user identity authentication succeeds.

For example, when the electronic device determines that the obtained fingerprint image matches the fingerprint image of the user stored in the electronic device, and the electronic device determines that the degree of matching between the feature of the fingerprint image and the feature of the fingerprint image of the fake fingerprint is greater than or equal to the second threshold and the degree of matching between the feature (such as the strength or the strength trend change) of the touch signal and the feature of the touch signal corresponding to the fake fingerprint is greater than or equal to the third threshold, the electronic device may determine that the user identity authentication succeeds.

It should be further understood that the fingerprint matching process and the fingerprint anti-counterfeiting process may be performed simultaneously, or the fingerprint anti-counterfeiting may be performed after the fingerprint matching is performed, or the fingerprint matching may be performed after the fingerprint anti-counterfeiting. This is not limited in this embodiment of this application.

In an embodiment, the fingerprint matching process and the fingerprint anti-counterfeiting process may be parallel, that is, the fingerprint matching process and the fingerprint anti-counterfeiting process may be performed simultaneously. After the electronic device determines that the fingerprint matching succeeds and the fingerprint is a real fingerprint, the electronic device may proceed to a next operation (for example, entering the desktop or performing a payment operation after successful unlocking). After the electronic device determines that the fingerprint matching fails or the fingerprint is a fake fingerprint, the electronic device may send fake fingerprint prompt information to the user, or the electronic device may prompt the user that the operation fails.

In an embodiment, the fingerprint matching process and the fingerprint anti-counterfeiting process may be in sequence. To be specific, the fingerprint matching may be performed first, and when the fingerprint matching succeeds, the fingerprint anti-counterfeiting may continue to be performed. If a result of the fingerprint anti-counterfeiting is a real fingerprint, the electronic device may proceed to a next operation (for example, entering the desktop or performing a payment operation after successful unlocking). Otherwise, the next operation is not allowed. When the fingerprint matching fails, a next fingerprint image may be re-collected for fingerprint matching, and fingerprint anti-counterfeiting processing is performed after the fingerprint matching succeeds.

Alternatively, the fingerprint anti-counterfeiting processing may be performed first, and when a result of the fingerprint anti-counterfeiting is a real fingerprint, the fingerprint matching may continue to be performed. If the fingerprint matching succeeds, the electronic device may perform a next operation (for example, entering the desktop or performing a payment operation after successful unlocking). Otherwise, the next operation is not allowed. When the result of the fingerprint anti-counterfeiting result is a fake fingerprint, a next fingerprint image and a touch signal may be re-collected to continue fingerprint anti-counterfeiting processing. The fingerprint matching process is performed after the result of the fingerprint anti-counterfeiting is a real fingerprint.

In an embodiment, if the electronic device determines that the fingerprint matching fails during the fingerprint matching process, the electronic device may obtain a next fingerprint image and a corresponding touch signal, and S520 to S530 are repeated. For obtaining of the corresponding touch signal, for example, the electronic device may make the collected next fingerprint image and a touch signal collected synchronously when a previous fingerprint image is collected form a new to-be-determined sample pair; or may make the collected next fingerprint image and a touch signal collected synchronously when the next fingerprint image is collected form a new to-be-determined sample pair; or may make the collected next fingerprint image, a touch signal collected synchronously when the next fingerprint image is collected, and a touch signal collected synchronously when a previous fingerprint image is collected form a to-be-determined sample pair.

In an embodiment, in a process of inputting a fingerprint by the user, the electronic device may remind the user of "Please rotate your finger counterclockwise" or "Please rotate your finger clockwise" by using a reminder window. The electronic device may remind the user to rotate the finger counterclockwise or clockwise, and a time for pressing or touching the fingerprint unlocking area by the finger of the user becomes longer, so that the electronic device may obtain more fingerprint images and corresponding touch signals.

Figure 4A:
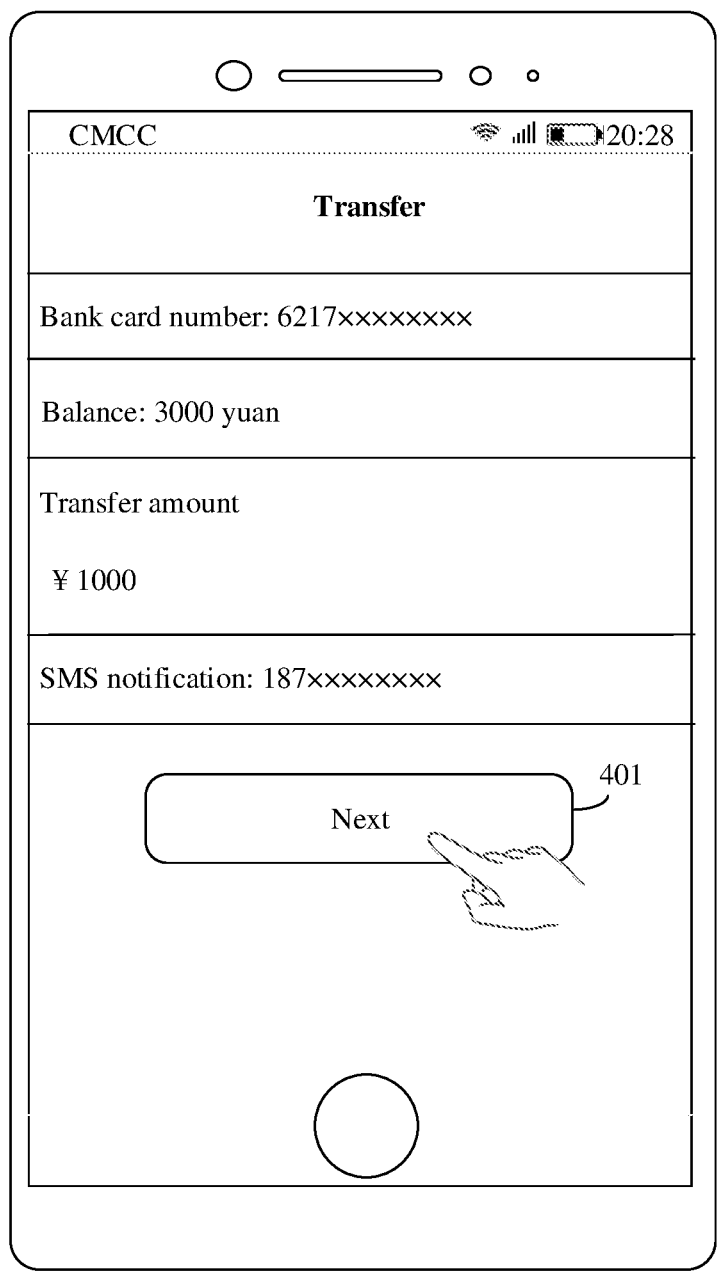
FIG. 4(a) to FIG. 4(d) are another group of GUIs according to an embodiment of this application.
Figure 4B:
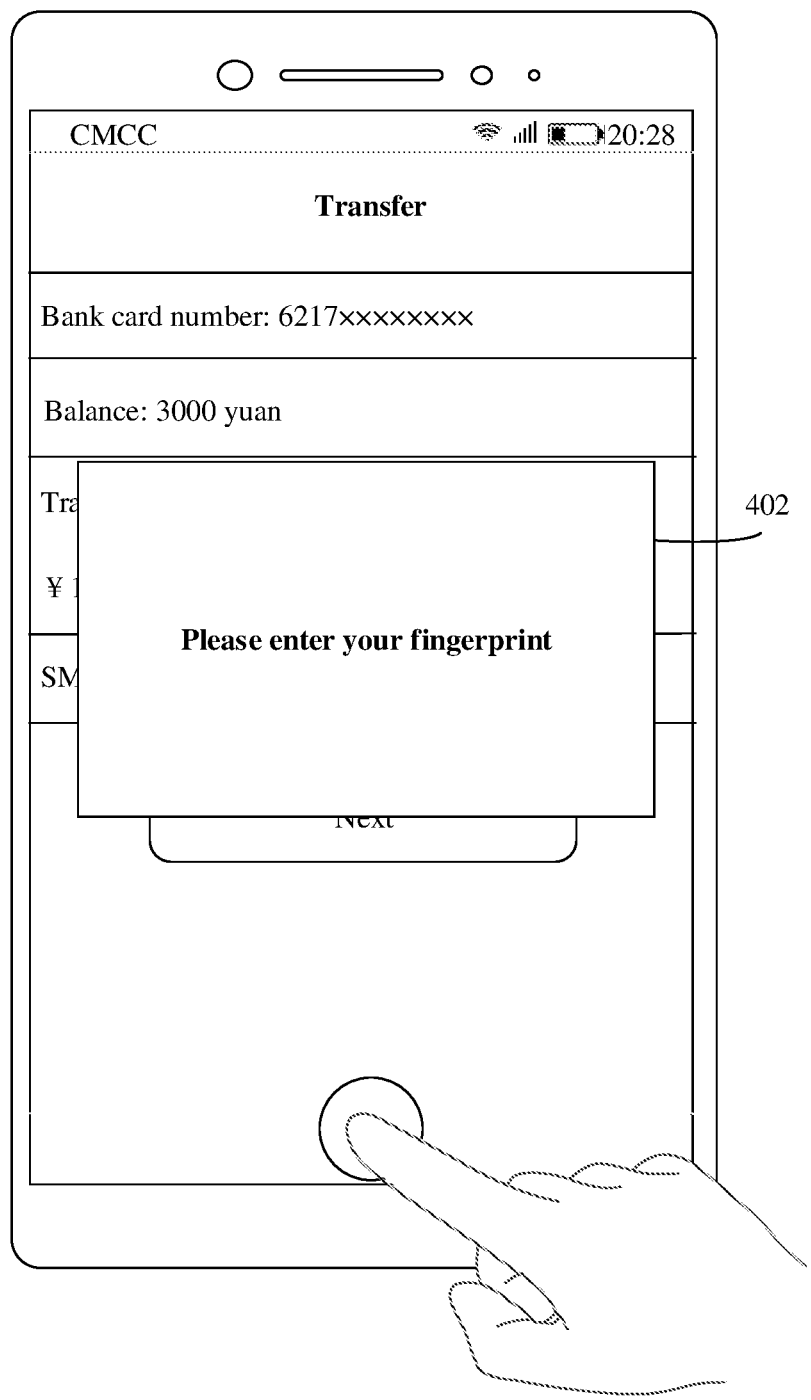
Figure 4C:
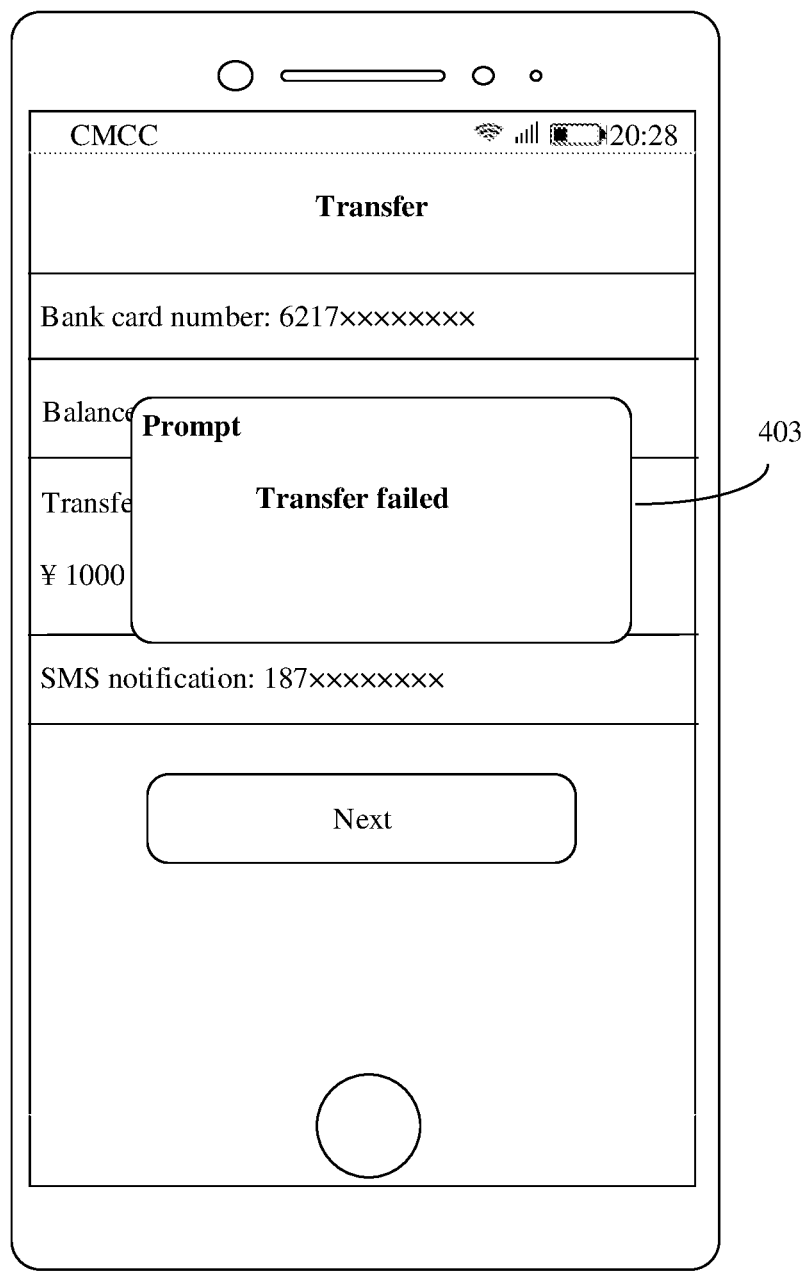
Figure 4D:
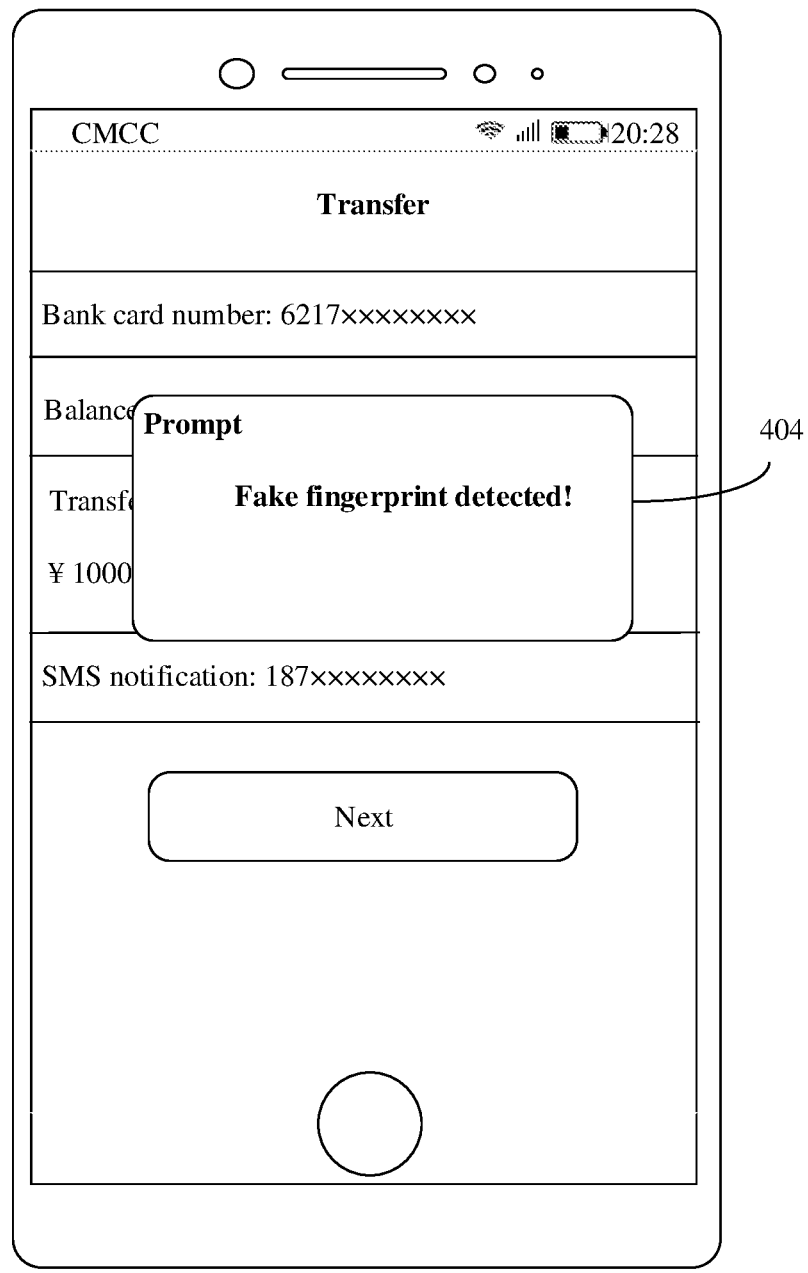

In an embodiment, as shown in FIG. 4(c), after reminding the user of "Transfer failed" by using the reminder window 403, the mobile phone may continue to remind the user of "Please re-enter fingerprint". After the mobile phone detects another pressing operation of the user, the mobile phone may obtain a fingerprint image and a corresponding touch signal, and S520 to S530 are repeated.

It should be further understood that, in this embodiment of this application, the touch signal collected synchronously when the previous fingerprint image is collected may be a touch signal collected by the touch sensor in a time period in which the fingerprint sensor collects the previous fingerprint image. The touch signal synchronously collected when the next fingerprint image is collected may be a touch signal collected by the touch sensor in a time period in which the fingerprint sensor collects the next fingerprint image.

It should be further understood that the next fingerprint image may be a non-first fingerprint image, and the next fingerprint image may be the second, or the third fingerprint image collected during one pressing operation of the use. Alternatively, the next fingerprint image may be a fingerprint image collected in a next pressing operation of the user within a preset time, or the like.

It should be further understood that manners of obtaining the fingerprint image and the touch signal are not limited in this embodiment of this application. The obtaining manner may be an in-display/under-display optical fingerprint recognition solution, or may be another fingerprint recognition solution, such as an ultrasonic solution, a radio frequency solution, or a capacitor solution.

According to the fingerprint anti-counterfeiting method in this embodiment of this application, the electronic device may determine, by using the obtained fingerprint image and touch signal, whether the fingerprint image is from a live finger. This better helps improve accuracy in detecting a fake fingerprint, and can effectively defend against a fake fingerprint attack faced by a current fingerprint matching recognition solution when compared with determining, based solely on a fingerprint image, whether the fingerprint image is from a live finger. Therefore, asset or property losses that may be brought to the user are avoided. In addition, no other new hardware is required, avoiding high costs.

Figure 6:
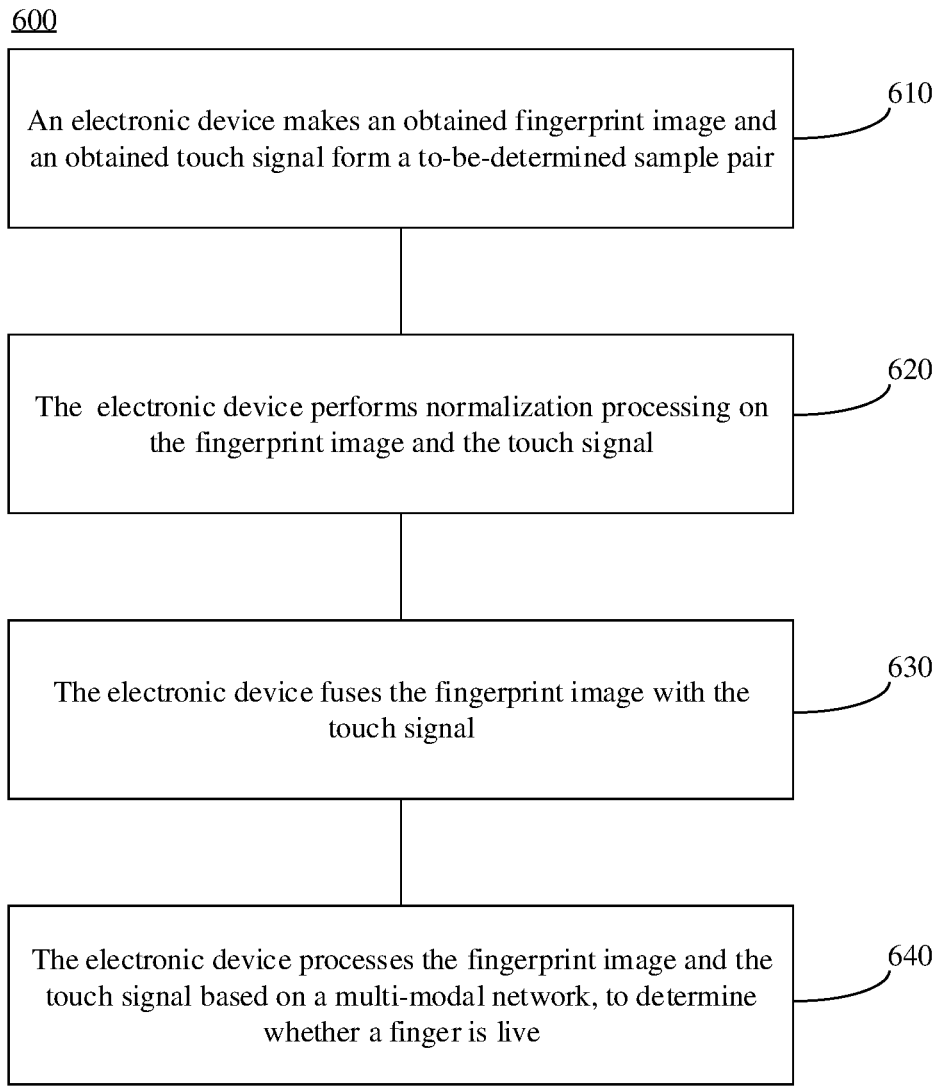
FIG. 6 is another schematic flowchart of a fingerprint anti-counterfeiting method according to an embodiment of this application.

FIG. 6 is a schematic flowchart of a fingerprint anti-counterfeiting method 600 according to an embodiment of this application. The method 600 may be a specific implementation of S530 of the method 500. The method 600 includes the following steps.

S610. An electronic device may make an obtained fingerprint image and an obtained touch signal form a to-be-determined sample pair.

For example, if the electronic device obtains the first fingerprint image, the electronic device may make the first fingerprint image and at least one frame of touch signal collected synchronously form the to-be-determined sample pair, or make the first fingerprint image, a touch signal collected synchronously, and at least one frame of touch signal buffered before the current collection form a to-be-determined sample pair.

For example, if the electronic device obtains a fingerprint image other than the first fingerprint image (for example, the second fingerprint image re-collected after the electronic device fails to authenticate the first fingerprint image), similar to the foregoing manner of processing the first fingerprint image, the electronic device may make a re-collected fingerprint image and a re-collected touch signal form a new to-be-determined sample pair; or make a re-collected fingerprint image, a re-collected touch signal, and a previously buffered touch signal form a new to-be-determined sample pair; or make a re-collected fingerprint image and a touch signal corresponding to the first fingerprint image form a new to-be-determined sample pair; or make a re-collected fingerprint image and a touch signal buffered before the first fingerprint image is collected form a new to-be-determined sample pair.

Optionally, before the electronic device makes the obtained fingerprint image and touch signal form the to-be-determined sample pair, the method further includes: the electronic device preprocesses the touch signal based on a screen status or a touch collection frequency.

It should be understood that the screen status may include a screen-on state and a screen-off state, and may further include a state such as a locked state or an unlocked state, and the touch collection frequency is an operating frequency when a touch sensor collects the touch signal.

In an embodiment, when the electronic device is in the screen-on state, the touch signal may be collected by using a first collection frequency, or when the electronic device is in the screen-off state, the touch signal may be collected by using a second collection frequency. The first collection frequency may be different from the second collection frequency.

It should be understood that the first collection frequency may alternatively be the same as the second collection frequency. When the first collection frequency is the same as the second collection frequency, the electronic device may not preprocess the multi-frame touch signal.

For example, when in the screen-on state, the electronic device may use 120 Hz for sampling, or when in the screen-off state, the electronic device may use 60 Hz for sampling. If a currently collected touch signal is collected in the screen-off state, the touch signal needs to be preprocessed.

In an embodiment, the preprocessing may include processing means such as interpolation processing, zero padding processing, replication processing, downsampling processing, and averaging processing.

It should be understood that a specific manner of the preprocessing is not limited in this embodiment of this application, and specific manners of various preprocessing means such as interpolation, zero padding, and downsampling are not limited either.

It should be further understood that, in this embodiment of this application, the interpolation processing may be: adding one or more values between a first touch signal and a second touch signal in the multi-frame touch signal. For example, the first touch signal and the second touch signal are two adjacent frames of touch signals in the multi-frame touch signal. The electronic device may insert an average value of the two adjacent frames of touch signals or a value of a previous frame in the two adjacent frames of touch signals between the two adjacent frames of touch signals, and so on.

It should be further understood that, in this embodiment of this application, the replication processing may be: replicating at least one copy of each frame of touch signal, for example, from original 12345 . . . to 1122334455 . . . . A specific copy replication is not limited.

It should further be understood that the foregoing frequency values are merely examples, and other values may be used in an actual implementation. In this case, means such as interpolation, zero padding, replication, and downsampling may also change accordingly.

It should be further understood that touch signals collected in different screen states may be different. Therefore, the touch signals may need to be processed by using the foregoing preprocessing.

For example, if a to-be-determined sample used for training a multi-modal network is original data obtained in a screen state A, when the trained multi-modal network is used to perform fingerprint anti-counterfeiting processing, proper processing of the foregoing preprocessing may be required for a touch signal collected in a screen state B, a frame quantity of the touch signal may be correspondingly increased or decreased, and the foregoing preprocessing may not be required for a touch signal collected in the screen state A. If data used by a training sample is data generated after the foregoing preprocessing (such as downsampling or sampling, for example, one frame of touch signal is sampled for every two or more adjacent frames) is performed on a touch signal collected in the screen state A, similar preprocessing also needs to be performed on the touch signal collected in the screen state A, and no preprocessing may need to be performed on the touch signal collected in the screen state B.

Optionally, before the electronic device makes the obtained fingerprint image and touch signal form a to-be-determined sample pair, the method further includes: the electronic device obtains, through truncation, a touch signal with a predetermined frame quantity or a predetermined size.

It should be understood that the predetermined size may be a predetermined value specified for a size of each frame of touch signal. For example, it is assumed that when represented by using a mathematical matrix, the touch signal is a matrix of A*B dimensions (A and B are integers greater than 0), and after truncation, is a matrix of a*b dimensions (a and b are greater than 0 and are integers less than or equal to A and B, separately).

For example, each frame of touch signal may be represented as a matrix of 16*16 dimensions by using a mathematical matrix, and the electronic device may truncate a matrix of 8*8 dimensions from the matrix of 16*16 dimensions as valid information of each frame of touch signal.

For example, the electronic device obtains P frames of touch signals, the predetermined frame quantity is Q frames, and both P and Q are positive integers. When P is greater than Q, the electronic device may obtain, through truncation, the first Q frames of touch signal, the middle Q frames of touch signals, or the last Q frames of touch signals from the P frames of touch signals.

It should be understood that, in this embodiment of this application, there is no actual sequence between preprocessing the touch signal by the electronic device and obtaining, through truncation, the touch signal with predetermined frame quantity or the predetermined size by the electronic device.

For example, based on the foregoing example, when P is less than Q, the electronic device may first preprocess the P frames of touch signals, and then obtain, through truncation, the first Q frames of touch signals, the middle Q frames of touch signals, or the last Q frames of touch signals from a preprocessed touch signal.

Certainly, when P is less than Q, the touch signal with the predetermined frame quantity may alternatively be obtained through truncation in another manner. For example, the electronic device may first obtain, through truncation, P' frames (P is greater than P') from the P frames of touch signals, and then preprocesses the truncated P' frames of touch signals, to obtain Q frames of touch signals.

S620. The electronic device performs normalization processing on the fingerprint image and the touch signal.

In an embodiment, the electronic device performs unified normalization on the fingerprint image and the touch signal, for example, normalizes data or data matrices of both the fingerprint image and the touch signal to be in a first range.

In another embodiment, the electronic device performs separate normalization on the fingerprint image and the touch signal, for example, normalizes data or a data matrix of the fingerprint image to be in a second range, and normalizes data or a data matrix of the touch signal to be in a third range.

Optionally, before the touch signal is normalized, special truncation processing may be performed on the touch signal. For example, when some elements in the data or the data matrix of the touch signal obtained by the electronic device are greater than X, values of the elements are set to a first threshold (for example, X). When some elements in the data or the data matrix of the touch signal are less than Y, values of the elements are set to a second threshold (for example, Y), where X is greater than Y.

Optionally, before the touch signal is normalized, whether special calibration processing is performed may be determined based on whether an exception exists in the touch signal. For example, when a quantity of elements in the data or the data matrix of the touch signal that have values exceeding or lower than a particular value is greater than or equal to a preset quantity, it is determined that an exception exists. In this case, calibration processing may be performed in a manner of, for example, performing negation (such as changing negative numbers to positive numbers) for the elements in the data or the data matrix of the touch signal that have values exceeding or lower than the particular value. This is not limited in this embodiment of this application.

It should be understood that both the fingerprint image and the touch signal may be represented in a mathematical manner, for example, data or data matrices corresponding to the fingerprint image and the touch signal are represented by using a one-dimensional array or a multi-dimensional matrix.

It should be further understood that the electronic device may also perform truncation processing on the fingerprint image, for example, obtain, through truncation, a fingerprint image with a preset size.

It should be further understood that there is no limitation on a sequence between performing normalization processing on the fingerprint image and the touch signal by the electronic device and performing preprocessing or truncation processing on the touch signal by the electronic device.

S630. The electronic device fuses the fingerprint image with the touch signal.

In an embodiment, a manner in which the electronic device fuses the fingerprint image with the touch signal includes but is not limited to splicing fingerprint image data and multi-frame touch signal data (for example, the touch signal following the fingerprint image, or the fingerprint image following the touch signal).

It should be noted that the fingerprint image and the touch signal are obtained after the foregoing steps are performed.

For example, the electronic device may obtain, through truncation, valid information with a matrix size of M*N from the fingerprint image data, where M and N are positive integers. The electronic device may obtain, through truncation, valid information with a matrix size of P*N from data obtained after the multi-frame touch signal data is spliced, where P is a positive integer. After being fused, a truncated fingerprint image and the touch signal become a matrix of (M+P)*N dimensions.

It should be understood that, in this embodiment of this application, a manner of fusing the fingerprint image with the touch signal is not limited to the foregoing examples, and there may be another fusing manner. This is not limited in this embodiment of this application.

It should be further understood that S630 is an optional step, the fingerprint image and the touch signal may alternatively be not fused, and the electronic device may directly send two groups of data to the multi-modal network.

In this embodiment of this application, the electronic device may fuse the touch signal with the fingerprint image. In this way, complexity of data transmission to the multi-modal network may be reduced to some extent, so as to simplify an implementation.

S640. The electronic device processes the fingerprint image and the touch signal based on a multi-modal network, to determine whether the finger is live.

In an embodiment, if the electronic device fuses the fingerprint image with the touch signal based on the foregoing step S630, the electronic device may first perform data separation before inputting the fingerprint image and the touch signal into corresponding subnetworks in the multi-modal network, so as to separately input them into corresponding subnetworks for processing.

Figure 7:
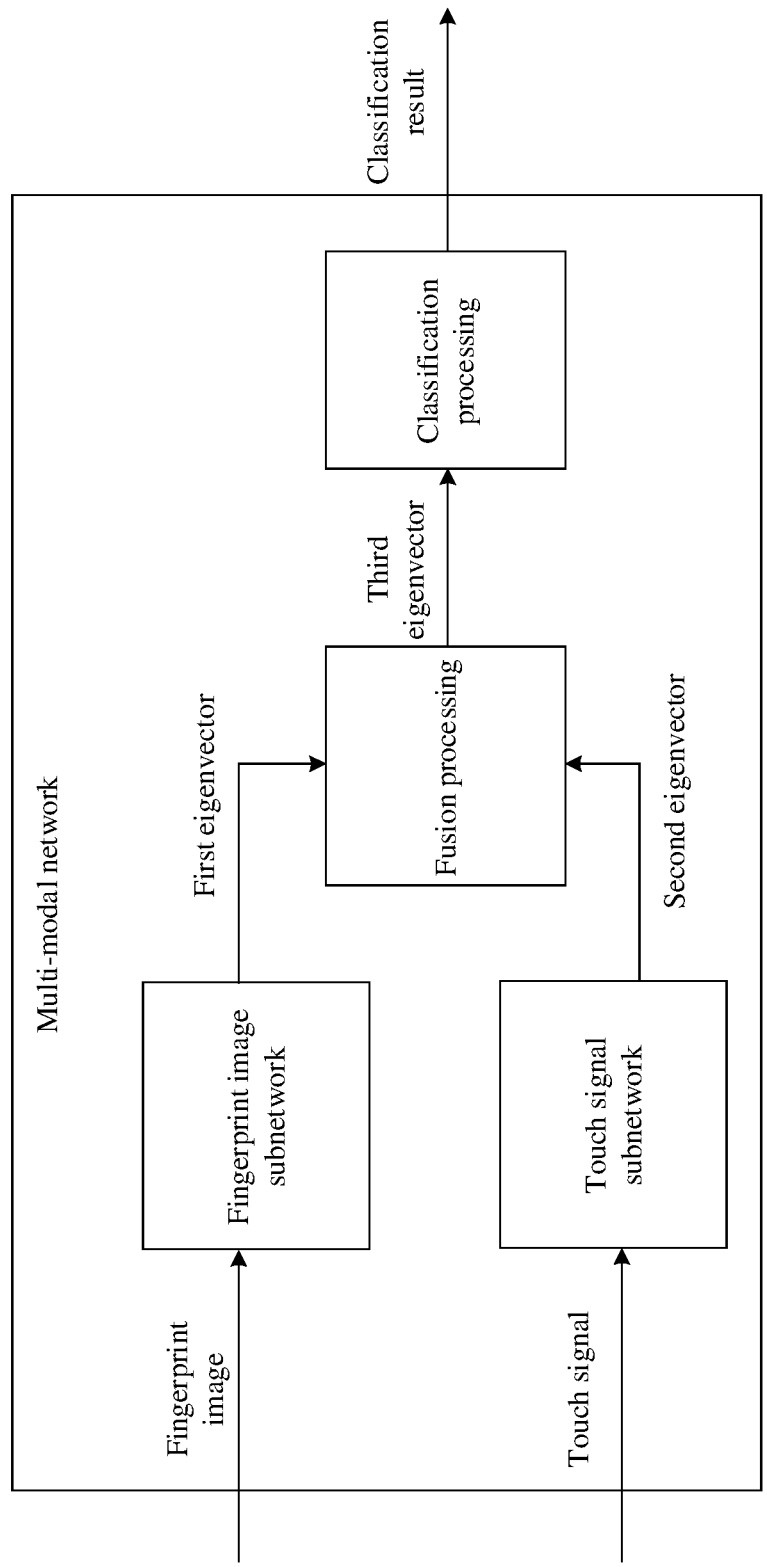
FIG. 7 is a schematic diagram of obtaining a classification result of a to-be-determined sample pair by using a multi-modal network according to an embodiment of this application.

FIG. 7 is a schematic diagram of processing a to-be-determined sample pair by using a multi-modal network to obtain a classification result according to an embodiment of this application. A process shown in FIG. 7 may be a description of an implementation process of S640.

An electronic device may perform determining by using both a fingerprint image and a touch signal, that is, determine whether a degree of matching between a feature of the to-be-determined sample pair and a feature of a fake fingerprint is greater than or equal to a first threshold. When the electronic device determines that the degree of matching between the feature of the to-be-determined sample pair and the feature of the fake fingerprint is greater than or equal to the first threshold, the electronic device may determine that the fingerprint image is a fingerprint image of a fake finger, or determine that the fingerprint image is not a fingerprint image of a live finger.

It should be understood that, in this embodiment of this application, the electronic device may perform determining based on the degree of matching between the feature of the to-be-determined sample pair and the feature of the fake fingerprint, or based on a degree of matching between the feature of the to-be-determined sample pair and a feature of a real fingerprint. For example, when the electronic device determines that the degree of matching between the feature of the to-be-determined sample pair and the feature of the real fingerprint is greater than or equal to a specific threshold, the electronic device may determine that a fingerprint is a real fingerprint (or the electronic device may determine that the finger is live).

For example, when receiving the current to-be-determined sample pair, the electronic device invokes a multi-modal network (for example, one set of depth network parameters) preset in the electronic device, and separately inputs the fingerprint image and the touch signal (which may be separated through signal separation) into two corresponding subnetwork channels (for example, a fingerprint image subnetwork and a touch signal subnetwork). The fingerprint image subnetwork may output a first eigenvector, and the touch signal subnetwork may output a second eigenvector.

The electronic device fuses (or combines) the eigenvectors separately output by the two channels to obtain a third eigenvector, and classification processing is finally performed on the third eigenvector by using a classification layer (such as a softmax function, a sigmoid function, or another function with a classification function) of the multi-modal network to output a classification result. In addition, in this embodiment of this application, the eigenvectors output by the two subnetworks may be weighted to obtain a fused eigenvector, so as to obtain a final determining result. For a specific manner, refer to the embodiment shown in FIG. 10.

For example, a classification result of 1 indicates a real fingerprint, and a classification result of 0 indicates a fake fingerprint. Alternatively, the classification result is a confidence of a real fingerprint (a probability of a real fingerprint) or a confidence of a fake fingerprint (a probability of a fake fingerprint). The electronic device may determine, based on the classification result, that a result is a real fingerprint or a fake fingerprint. For example, when the probability that the classification result is a fake fingerprint is 96%, which is greater than a preset threshold of 95%, it may be determined that the result is a fake fingerprint.

For another example, a classification result of 1 represents a real fingerprint, a classification result of 2 represents a 2D fake fingerprint, and a classification result of 3 represents a 3D fake fingerprint. Alternatively, the classification result is a confidence of a real fingerprint, a confidence of a 2D fake fingerprint, or a confidence of a 3D fake fingerprint.

It should be understood that, the fingerprint image subnetwork and the touch signal subnetwork included in the multi-modal network may be implemented by using a deep learning network, and more specifically, may be implemented by using a convolutional neural network. For example, the neural network may be formed by using a convolutional layer, a pooling layer, a fully connected layer, and the like, and finally, two subnetworks are combined by using one or more layers of networks (for example, the fully connected layer). A specific manner is not limited in this embodiment of this application.

Figure 8:
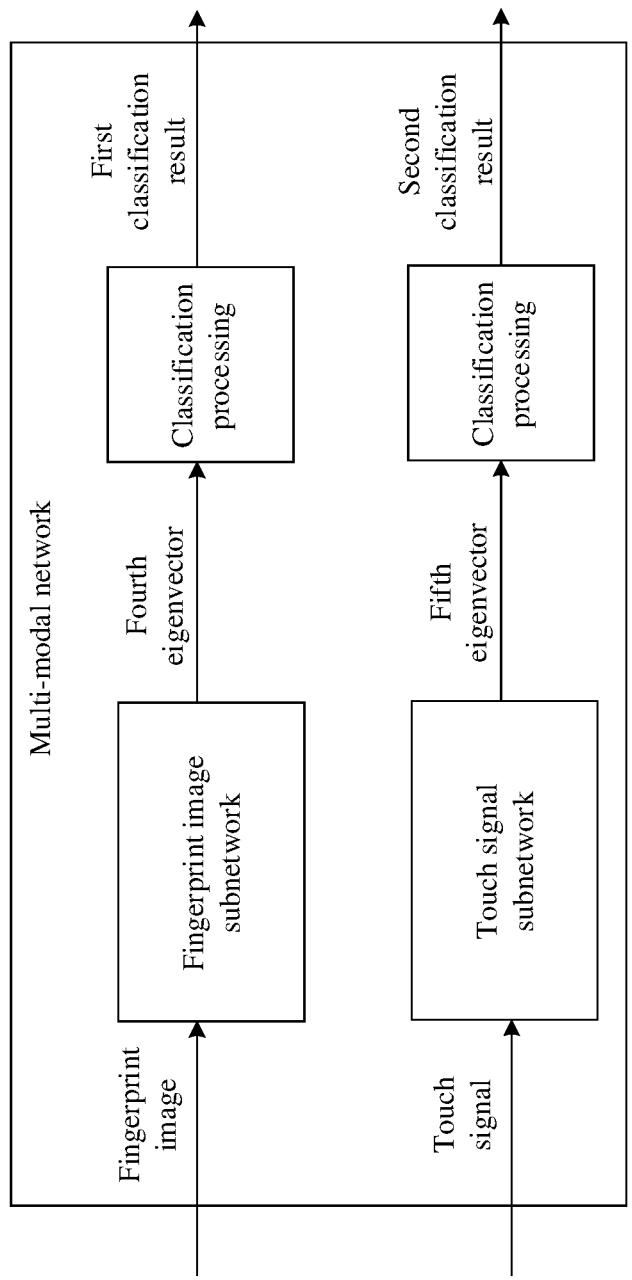
FIG. 8 is a schematic diagram of obtaining a classification result of a to-be-determined sample pair by using a multi-modal network according to an embodiment of this application.

FIG. 8 is a schematic diagram of obtaining a classification result of a to-be-determined sample pair by using a multi-modal network according to an embodiment of this application. A process shown in FIG. 8 may be a description of another implementation process of S640.

An electronic device may perform determining by using a fingerprint image and a touch signal separately, that is, determine whether a degree of matching between a feature of the fingerprint image and a feature of a fake fingerprint image is greater than or equal to a second threshold, and also determine whether a degree of matching between a feature (such as a strength or a strength change trend) of the touch signal and a feature (such as a strength or a strength change trend) of a touch signal corresponding to a fake fingerprint is greater than or equal to a third threshold. When the degree of matching between the feature of the fingerprint image and the feature of the fake fingerprint image is greater than or equal to the second threshold, and the degree of matching between the feature of the touch signal and the feature of the touch signal corresponding to the fake fingerprint is greater than or equal to the third threshold, the electronic device may determine that the fingerprint image is a fingerprint image of a fake finger, or determine that the fingerprint image is not a fingerprint image of a live finger.

It should be understood that, in this embodiment of this application, the electronic device may alternatively determine a degree of matching between a feature of the fingerprint image and a feature of a real fingerprint image and a degree of matching between a feature (such as a strength or a strength change trend) of the touch signal and a feature (such as a strength or a strength change trend) of a touch signal corresponding to a real fingerprint. For example, when the degree of matching between the feature of the fingerprint image and the feature of the real fingerprint image is greater than or equal to a fourth threshold, and the degree of matching between the feature (such as the strength or the strength change trend) of the touch signal and the feature (such as the strength or the strength change trend) of the touch signal corresponding to the real fingerprint is greater than or equal to a fifth threshold, the electronic device may determine that the touch signal is a real fingerprint (or the electronic device may determine that the finger is live).

For example, when receiving the current to-be-determined sample pair, the electronic device invokes a multi-modal network (for example, two sets of depth network parameters) preset in the electronic device, and separately inputs the fingerprint image and the touch signal (which may be separated through signal separation) into two corresponding subnetwork channels (for example, a fingerprint image subnetwork and a touch signal subnetwork). The fingerprint image subnetwork outputs a fourth eigenvector, and the touch signal subnetwork outputs a fifth eigenvector. The electronic device may separately perform classification processing on the fourth eigenvector and the fifth eigenvector, to obtain a first classification result and a second classification result. For example, a classification result of 1 indicates a real fingerprint, and a classification result of 0 indicates a fake fingerprint. Alternatively, the classification result is a confidence of a real fingerprint (a probability of a real fingerprint) or a confidence of a fake fingerprint (a probability of a fake fingerprint). The electronic device may determine, based on the two classification results, that a result is a real fingerprint or a fake fingerprint.

For example, when the first classification result output by the fingerprint image subnetwork is 0 and the second classification result output by the touch signal subnetwork is 0, the electronic device may determine that the result is a fake fingerprint. Alternatively, when the first classification result output by the fingerprint image subnetwork is 0, and the second classification result output by the touch signal subnetwork is 1, the electronic device may determine that the result is a fake fingerprint. Alternatively, when the first classification result output by the fingerprint image subnetwork is 1, and the second classification result output by the touch signal subnetwork is 0, the electronic device may determine that the result is a fake fingerprint. Alternatively, when the first classification result output by the fingerprint image subnetwork is 1, and the second classification result output by the touch signal subnetwork is 1, the electronic device may determine that the result is a real fingerprint. Certainly, the classification results output by the two subnetworks may alternatively be confidences of a real fingerprint and/or a fake fingerprint, and then the electronic device obtains a final determining result based on the confidences. This is not limited in this embodiment of this application. In addition, in this embodiment of this application, the classification results output by the two subnetworks may be weighted to obtain a final determining result. For a specific manner, refer to the embodiment shown in FIG. 11 below.

For another example, when the first classification result output by the fingerprint image subnetwork is that the probability of a fake fingerprint is 95%, and the second classification result output by the touch signal subnetwork is that the probability of a fake fingerprint is 96%, the probabilities of a fake fingerprint that are output by the two classification results are both greater than or equal to 95%, and the electronic device may determine that the result is a fake fingerprint.

It should be understood that, the fingerprint image subnetwork and the touch signal subnetwork included in the multi-modal network may be considered as relatively independent networks, and may be implemented separately by using deep learning networks, or more specifically, may be implemented by using convolutional neural networks. Details are the same as those described above, and are not described again.

Figure 9A:
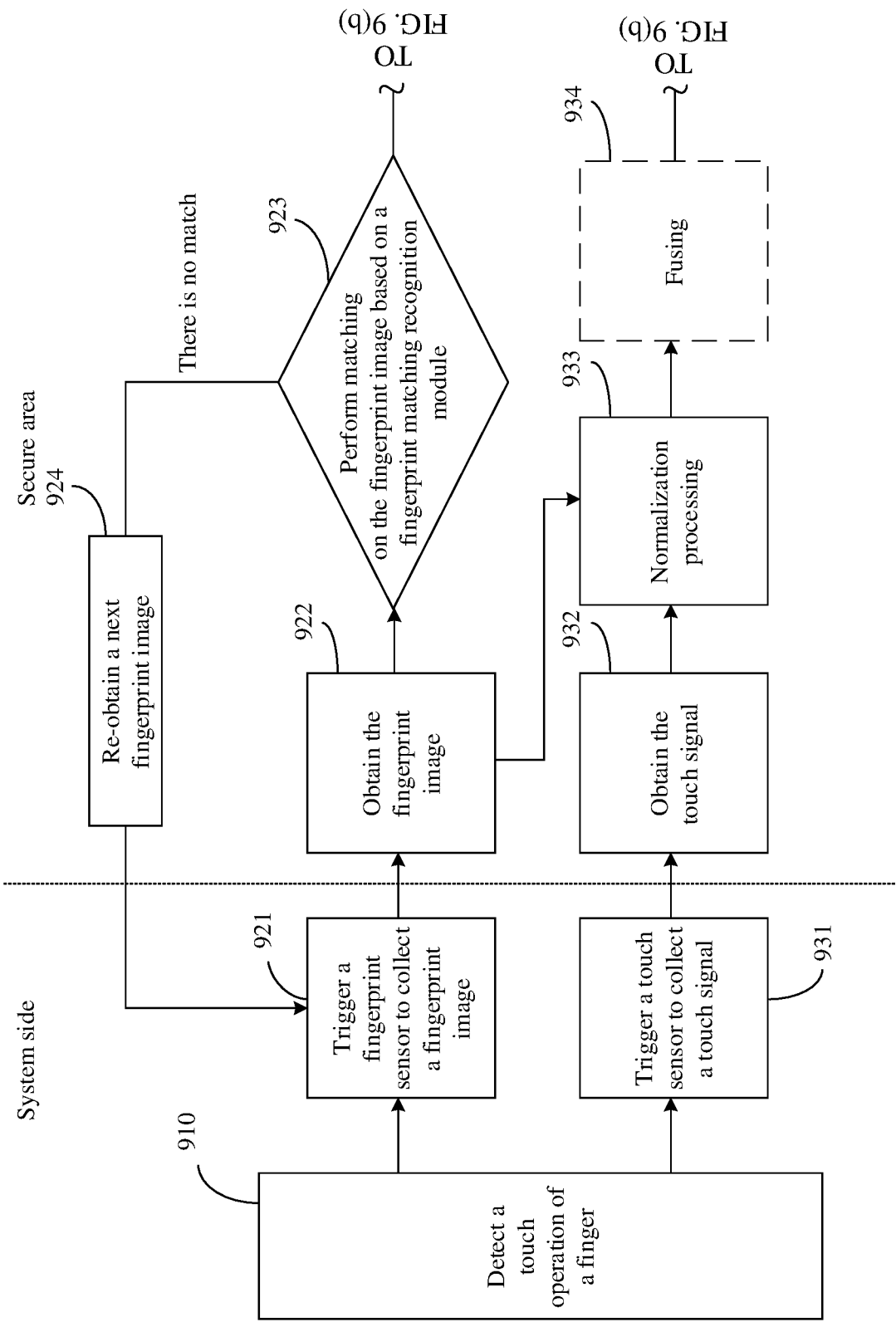
FIG. 9(a) and FIG. 9(b) are another schematic flowchart of a fingerprint anti-counterfeiting method according to an embodiment of this application.
Figure 9B:
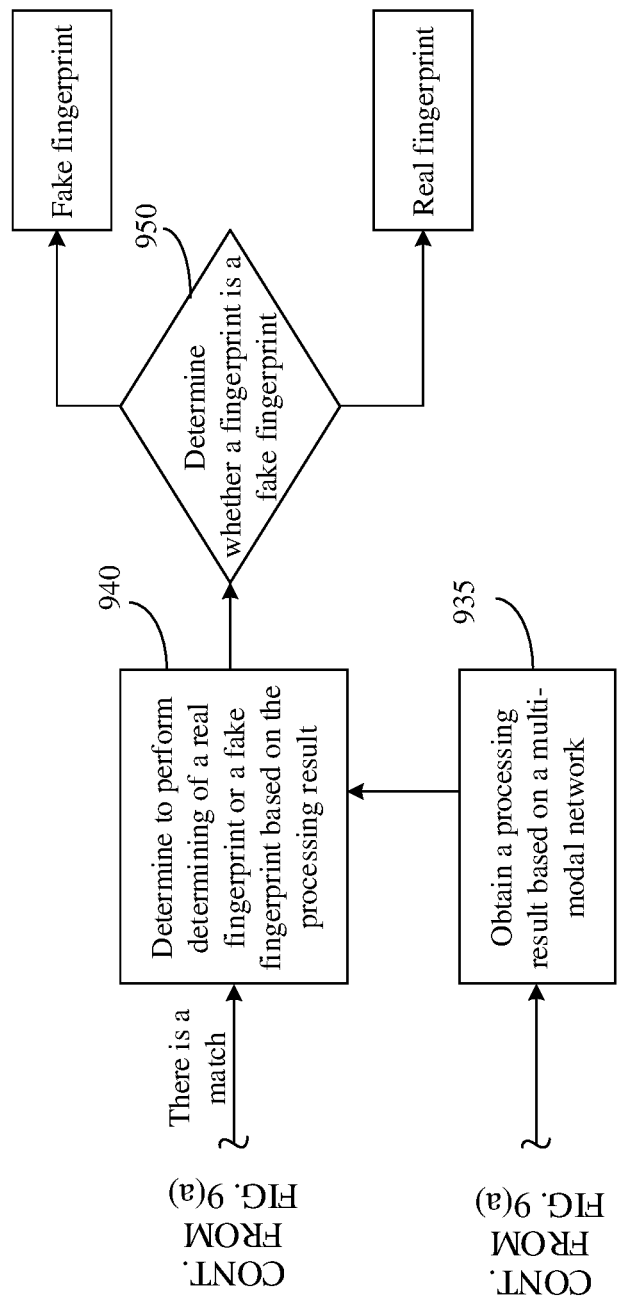

FIG. 9(a) and FIG. 9(b) are another schematic flowchart of a fingerprint anti-counterfeiting method 900 according to an embodiment of this application. The method 900 is described with reference to a fingerprint matching process and a fingerprint anti-counterfeiting process during actual use (for example, fingerprint unlocking). As shown in FIG. 9(a) and FIG. 9(b), the method 900 includes the following steps:

S910. An electronic device detects a touch operation of a finger.

For example, the touch operation may be an action such as pressing a particular position (for example, a screen position above a fingerprint sensor or another position) of a screen or hovering over a particular position of a screen at a specific distance by a finger.

S921. The electronic device triggers a fingerprint sensor to collect a fingerprint image.

It should be understood that, in this embodiment of this application, a manner in which the electronic device triggers the fingerprint sensor to collect the fingerprint image is not limited.

S922. The electronic device obtains the fingerprint image collected by the fingerprint sensor.

S923. The electronic device performs matching on the fingerprint image based on a fingerprint matching recognition module.

For example, the electronic device may compare the fingerprint image with a fingerprint image prestored by a user in the electronic device. When a degree of matching between a feature of the fingerprint image and a feature of the fingerprint image prestored by the user in the electronic device is greater than or equal to a specific threshold, the electronic device may determine that the fingerprint image matches the fingerprint image of the user, and the matching performed by the electronic device on the fingerprint image succeeds. On the contrary, if the degree of matching between the feature of the fingerprint image and the feature of the fingerprint image prestored by the user in the electronic device is less than a specific threshold, the electronic device may determine that the fingerprint image does not match the fingerprint image of the user, and the matching performed by the electronic device on the fingerprint image fails.

It should be understood that, in this embodiment of this application, for a process in which the electronic device performs matching on the fingerprint image based on the fingerprint matching recognition module, refer to an existing fingerprint matching process. This is not limited in this embodiment of this application.

S924. If the electronic device determines that the fingerprint image does not match a fingerprint image prestored by a user, the electronic device re-obtains a next fingerprint image, that is, performs steps S921 to S923 again.

It should be understood that S921 to S924 are a fingerprint matching process.

It should be understood that, in this embodiment of this application, the fingerprint matching process may use an existing fingerprint matching method, or may be another fingerprint matching method that may be used in the future. The fingerprint matching process is not limited in this embodiment of this application.

S931. The electronic device triggers a touch sensor to collect a touch signal.

S932. The electronic device obtains the touch signal collected by the touch sensor.

It should be understood that after detecting that a finger presses the fingerprint sensor, the electronic device may simultaneously trigger the fingerprint sensor and the touch sensor to synchronously collect the fingerprint image and the touch signal. However, before this, the electronic device may further detect another touch interrupt event such as pressing the screen (a position other than the fingerprint sensor), hovering over the screen at a specific distance, or pressing the power button by the finger, so that the touch sensor collects touch signals. The collected touch signals are buffered in the electronic device for temporary storage. When buffer space is full, an earliest touch signal is cleared, and a latest collected touch signal is stored. The buffered touch signal may be used later to form a touch signal sequence together with a touch signal collected synchronously each time a fingerprint image is collected. Certainly, the buffered touch signal may alternatively be not used.

It should be further understood that S921 and S931 may be performed on a system side (such as an REE), and S922 and S932 may be actions of a secure area (such as a TEE, or more specifically, a fingerprint application in the secure area). For example, the secure area receives, from the system side, a touch signal and a fingerprint image collected by the sensors and obtained by the system side, or receives related information (such as a location) of the touch signal and the fingerprint image from the system side and then reads the touch signal and the fingerprint image from a particular location. Alternatively, the secure area receives any one of the fingerprint image and the touch signal from the system side, and reads the corresponding other type of data based on related information of the other type of data sent by the system side. Certainly, the electronic device may have another module to replace the system side to implement the foregoing functions. This is not limited in this embodiment of this application.

S933. The electronic device performs normalization processing on the obtained fingerprint image and touch signal.

It should be understood that before the electronic device performs normalization processing on the obtained fingerprint image and touch signal, the electronic device makes the obtained fingerprint image and touch signal form a to-be-determined sample pair. For a specific manner, refer to the description of S610 in the foregoing method 600. For brevity, details are not described herein again.

It should be further understood that, for the normalization processing performed by the electronic device on the obtained fingerprint image and touch signal, refer to the description of S620 in the foregoing method 600. For brevity, details are not described herein again.

S934. The electronic device fuses the fingerprint image with the touch signal corresponding to the fingerprint image.

It should be understood that, for a manner in which the electronic device fuses the fingerprint image with the touch signal corresponding to the fingerprint image, refer to the description of S630 in the foregoing method 600. For brevity, details are not described herein again.

S935. The electronic device processes the fingerprint image and the touch signal based on a multi-modal network, to obtain a processing result.

It should be understood that, for a specific processing manner, refer to descriptions of S640 in the foregoing method 600 and FIG. 7 or FIG. 8. For brevity, details are not described herein again.

It should be understood that S931 to S935 are a fingerprint anti-counterfeiting processing process.

S940. If the electronic device determines that the fingerprint image matches the fingerprint image prestored by the user in S923, the electronic device may determine to perform determining of a real fingerprint or a fake fingerprint based on the processing result.

S950. The electronic device determines, based on the processing result, whether a fingerprint corresponding to the finger is a real fingerprint.

It should be understood that if the electronic device determines that the fingerprint is a real fingerprint, the electronic device may perform a corresponding service operation. For example, when the user uses online payment, the electronic device may remind the user to input the fingerprint. When fingerprint matching succeeds and it is determined that the fingerprint is a real fingerprint, the electronic device may complete a payment operation. On the contrary, if the electronic device determines that the fingerprint is a fake fingerprint, the electronic device may send payment failure prompt information, or the electronic device may send fake fingerprint prompt information.

It should be further understood that, in the fingerprint anti-counterfeiting method described in the foregoing method 900, the fingerprint matching process and the fingerprint anti-counterfeiting process may be parallel, that is, the fingerprint matching process and the fingerprint anti-counterfeiting process may be performed simultaneously. After the electronic device determines that the fingerprint matching succeeds and the fingerprint is a real fingerprint, the electronic device may proceed to a next operation (for example, entering a desktop or performing a payment operation after successful unlocking). After the electronic device determines that the fingerprint matching fails or the fingerprint is a fake fingerprint, the electronic device may send fake fingerprint prompt information to the user, or the electronic device may prompt the user that the operation fails.

In an embodiment, the fingerprint matching process and the fingerprint anti-counterfeiting process may be in sequence. To be specific, the fingerprint matching may be performed first, and when the fingerprint matching succeeds, the fingerprint anti-counterfeiting may continue to be performed. If a result of the fingerprint anti-counterfeiting is a real fingerprint, the electronic device may proceed to a next operation (for example, entering a desktop or performing a payment operation after successful unlocking). Otherwise, the next operation is not allowed. When the fingerprint matching fails, a next fingerprint image may be re-collected for fingerprint matching, and fingerprint anti-counterfeiting processing is performed after the fingerprint matching succeeds.

Alternatively, the fingerprint anti-counterfeiting processing may be performed first, and when a result of the fingerprint anti-counterfeiting is a real fingerprint, the fingerprint matching may continue to be performed. If the fingerprint matching succeeds, the electronic device may perform a next operation (for example, entering a desktop or performing a payment operation after successful unlocking). Otherwise, the next operation is not allowed. When the result of the fingerprint anti-counterfeiting result is a fake fingerprint, a next fingerprint image and a touch signal may be re-collected to continue fingerprint anti-counterfeiting processing. The fingerprint matching process is performed after the result of the fingerprint anti-counterfeiting is a real fingerprint.

According to the fingerprint anti-counterfeiting method in this embodiment of this application, the electronic device may perform determining for the obtained fingerprint image and multi-frame touch signal based on the multi-modal network, to determine whether the fingerprint image is from a live finger. This better helps improve accuracy in detecting a fake fingerprint, and can effectively defend against a fake fingerprint attack faced by a current fingerprint matching recognition solution when compared with performing determining based solely on a fingerprint image. Therefore, asset or property losses that may be brought to the user are avoided. In addition, no other new hardware is required, avoiding high costs.

The fingerprint anti-counterfeiting process in this embodiment of this application is described above with reference to FIG. 2(a) to FIG. 9(b). The multi-modal network used in the fingerprint anti-counterfeiting process may be obtained through training based on a deep learning network (for example, a convolutional neural network). Specifically, sample pairs including a large quantity of fingerprint images and touch signals are used for learning, to finally obtain parameters such as a network structure and weights of various layers. The following describes a process of training the multi-modal network in embodiments of this application.

In an embodiment, joint training may be performed on the fingerprint image and the touch signal to obtain the multi-modal network.

Figure 10:
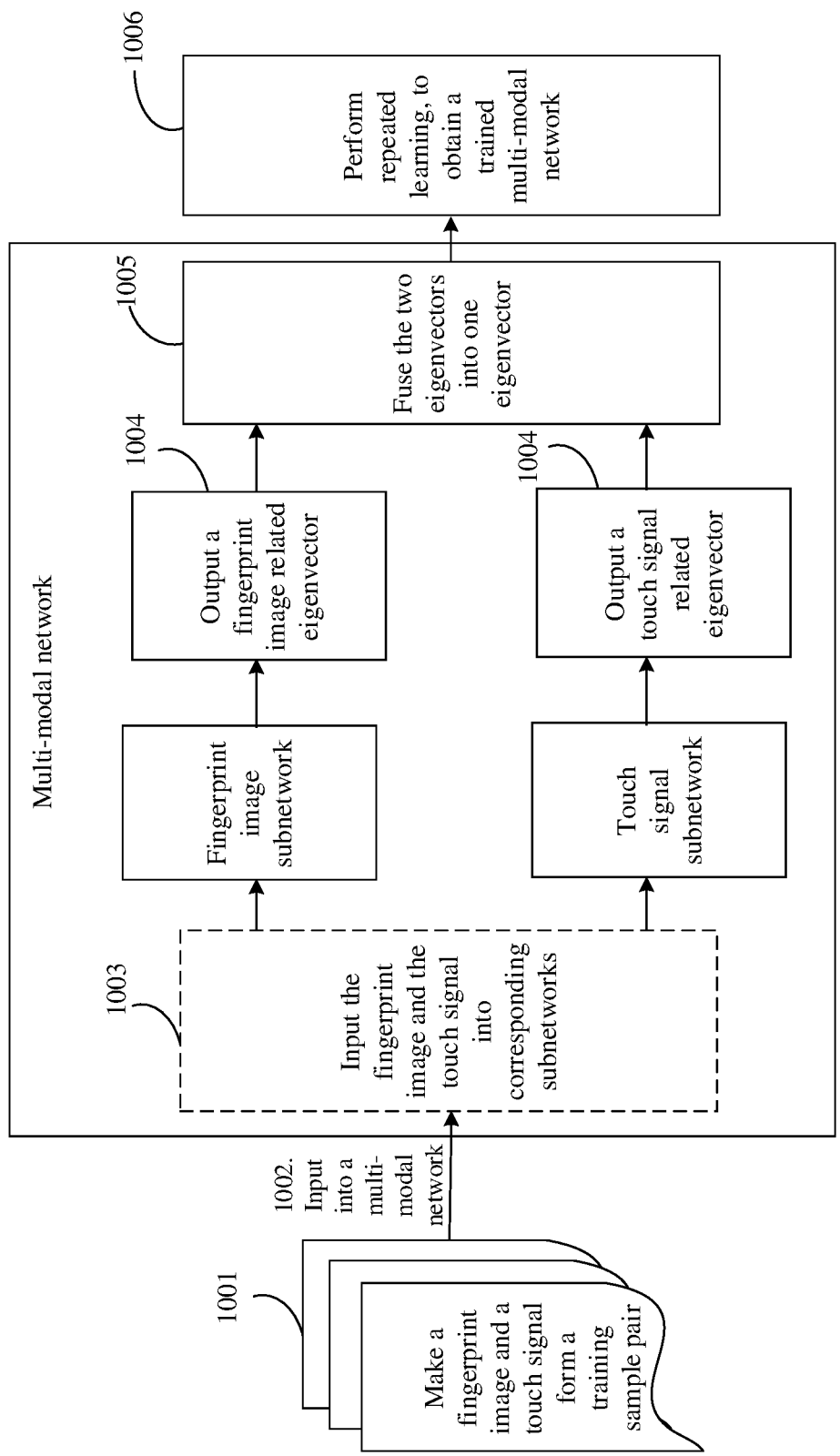
FIG. 10 is a schematic diagram of a process of obtaining a multi-modal network through joint training according to an embodiment of this application.

FIG. 10 is a schematic diagram of a process of obtaining a multi-modal network through joint training according to an embodiment of this application. As shown in FIG. 10, the process includes the following steps.

S1001. Make a fingerprint image collected each time of pressing and a corresponding touch signal form a training sample pair.

The training sample pair may be a real fingerprint training sample pair, or may be a fake fingerprint training sample pair. A large quantity of training sample pairs form a real fingerprint training set and a fake fingerprint training set. The real fingerprint training sample set may include one or more real fingerprint training sample pairs. The fake fingerprint training set may include one or more fake fingerprint training sample pairs.

S1002. Input training sample pairs in a training set into a multi-modal network in sequence.

The multi-modal network can be divided into two sub-networks: a fingerprint image subnetwork and a touch signal subnetwork.

It should be understood that, the fingerprint image subnetwork and the touch signal subnetwork included in the multi-modal network may be implemented by using a deep learning network, and more specifically, may be implemented by using a convolutional neural network. For example, the neural network may be formed by using a convolutional layer, a pooling layer, a fully connected layer, and the like, and finally, two subnetworks are combined by using one or more layers of networks (for example, the fully connected layer). A specific manner is not limited in this embodiment of this application.

It should be understood that if the fingerprint image and the touch signal in the training sample pair are fused, before the fingerprint image and the touch signal are respectively output to the fingerprint image subnetwork and the touch signal subnetwork, the fingerprint image and the touch signal may be separated first, and then input into corresponding subnetworks.

S1003. Input the fingerprint image and the touch signal in the training sample pair into two subnetworks separately through corresponding subnetwork channels to perform independent feature learning and extraction.

S1004. After the fingerprint image is input into the fingerprint image subnetwork, a learned fingerprint image related eigenvector may be output, and after the touch signal is input into the touch signal subnetwork, a touch signal related eigenvector may be output.

S1005. Fuse the two eigenvectors output in S1004 to obtain one eigenvector.

It should be noted that, when fusing the fingerprint image related eigenvector (denoted as a first eigenvector) with the touch signal related eigenvector (denoted as a second eigenvector), the electronic device may further weight the first eigenvector and the second eigenvector to obtain a third eigenvector.

For example, the first eigenvector is multiplied by a first weighting coefficient, the second eigenvector is multiplied by a second weighting coefficient, and then the first eigenvector and the second eigenvector separately multiplied by the weighting coefficients are fused, to obtain the third eigenvector. Actually, the first weighting coefficient and the second weighting coefficient may be different, or a sum of them is 1 (a maximum percentage weight of 1 is used as an example). Specific values of the first weighting coefficient and the second weighting coefficient are not limited in this embodiment of this application.

S1006. After repeated learning, a trained multi-modal network may be obtained.

During actual use, the to-be-determined sample pair (after normalization and fusion) including the fingerprint image collected each time and the corresponding touch signal needs to be input into the multi-modal network for matching processing. If a feature of the to-be-determined sample pair can match a feature corresponding to a fake fingerprint, it is determined that the fingerprint is a fake fingerprint, so as to perform interception processing. Alternatively, if a feature of the to-be-determined sample pair can match a feature corresponding to a real fingerprint, it is determined that the fingerprint is a real fingerprint.

In an embodiment, the multi-modal network may be obtained by separately training the fingerprint image and the touch signal.

Figure 11:
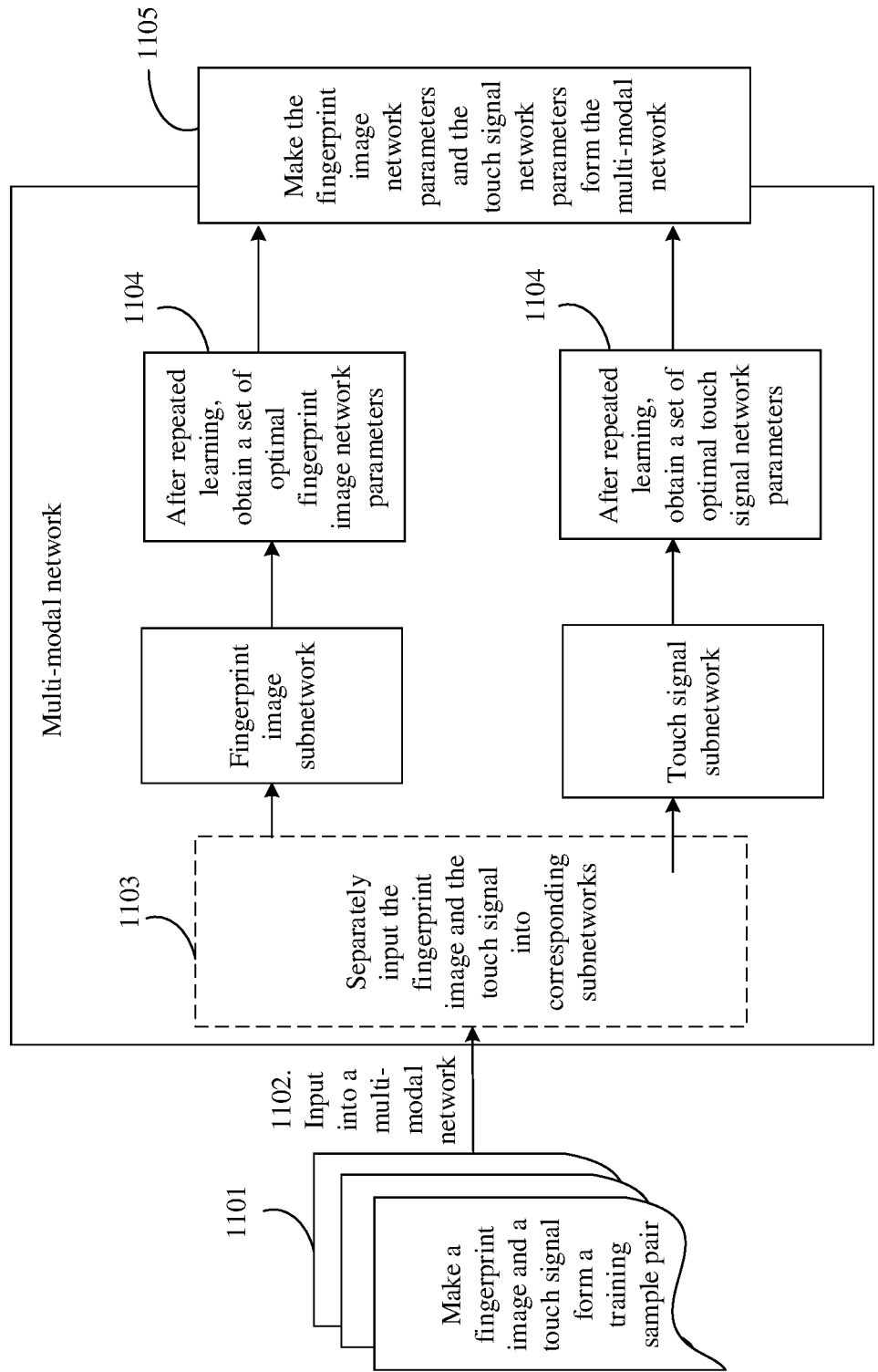
FIG. 11 is a schematic diagram of a process of obtaining a multi-modal network through separate training according to an embodiment of this application.

FIG. 11 is a schematic diagram of a process of obtaining a multi-modal network through separate training according to an embodiment of this application. As shown in FIG. 11, the process includes the following steps.

S1101. Make a fingerprint image collected each time of pressing and a corresponding touch signal form a training sample pair.

S1102. Input training sample pairs in a training set into the multi-modal network in sequence.

It should be understood that for S110 and S1102, refer to the descriptions of S1001 and S1002. For brevity, details are not described herein again.

S1103. Input a fingerprint image in the training sample pair into a fingerprint image subnetwork for independent feature learning, and input a touch signal in the training sample pair into a touch signal subnetwork for independent feature learning.

It should be understood that, the fingerprint image subnetwork and the touch signal subnetwork included in the multi-modal network may be considered as relatively independent networks, and may be implemented separately by using deep learning networks, or more specifically, may be implemented by using convolutional neural networks. Details are the same as those described above, and are not described again.

S1104. After repeated learning, the fingerprint image subnetwork outputs a set of optimal fingerprint image network parameters, and the touch signal subnetwork outputs a set of optimal touch signal network parameters.

S1105. The fingerprint image network parameters and the touch signal network parameters together form the multi-modal network.

It should be noted that, when making the fingerprint image network parameters and the touch signal network parameters together form the multi-modal network, the electronic device may also weight the two types of parameters. Specific weighting coefficients of the two types of parameters are not limited in this embodiment of this application.

It may be understood that the foregoing two types of weighting may implement corresponding weighting on output results of the two subnetworks during actual use. For example, a first determining result is obtained by using the fingerprint image subnetwork, and a second determining result is obtained by using the touch signal subnetwork. After corresponding weighting described above is separately performed on the first determining result and the second determining result, a final determining result, namely, a determining result of the multi-modal network, is obtained.

During actual use, the fingerprint image collected each time and a corresponding touch signal sequence need to be input into the two subnetworks separately for matching processing. If a feature of the collected fingerprint image matches a feature of a fingerprint image corresponding to a fake fingerprint, and a feature of the touch signal matches a feature of a touch signal corresponding to a fake fingerprint, it is determined that the fingerprint is a fake fingerprint, so as to perform interception processing. Alternatively, if a feature of the collected fingerprint image matches a feature of a fingerprint image corresponding to a real fingerprint, and a feature of the touch signal matches a feature of a touch signal corresponding to a real fingerprint, it is determined that the fingerprint is a real fingerprint.

According to the fingerprint anti-counterfeiting method in this embodiment of this application, the electronic device may perform determining for the obtained fingerprint image and multi-frame touch signal based on the multi-modal network, to determine whether the fingerprint image is from a live finger. This better helps improve accuracy in detecting a fake fingerprint, and can effectively defend against a fake fingerprint attack faced by a current fingerprint matching recognition solution when compared with performing determining based solely on a fingerprint image. Therefore, asset or property losses that may be brought to a user are avoided. In addition, no other new hardware is required, avoiding high costs.

It may be understood that, to implement the foregoing functions, the electronic device includes corresponding hardware and/or software modules for performing the functions. With reference to algorithm steps of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the electronic device may be divided into function modules based on the foregoing method examples. For example, each function module corresponding to each function may be obtained through division, or two or more functions may be integrated into one processing module. The integrated module may be implemented in a form of hardware. It should be noted that the module division in the embodiments is an example, and is merely logical function division. In an actual implementation, another division manner may be used.

Figure 12:
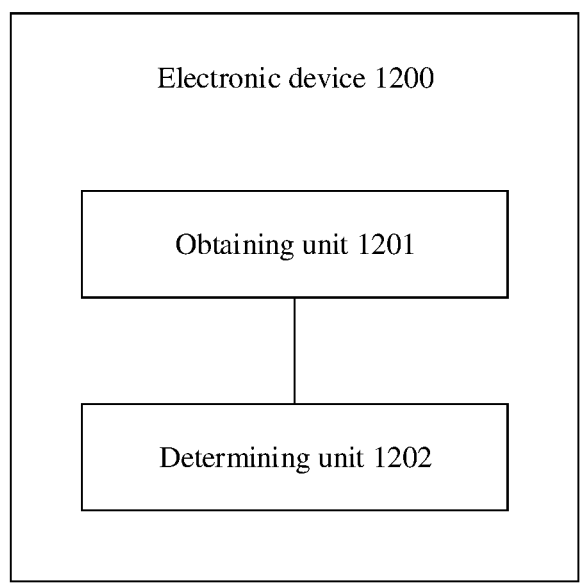
FIG. 12 is a schematic block diagram of an electronic device according to an embodiment of this application.

When each function module is obtained through division corresponding to each function, FIG. 12 is a possible schematic composition diagram of an electronic device 1200 in the foregoing embodiment. As shown in FIG. 12, the electronic device 1200 may include an obtaining unit 1201 and a determining unit 1202.

The obtaining unit 1201 may be configured to support the electronic device to perform the foregoing step S520 and the like, and/or perform other processes of technologies described in this specification.

The determining unit 1202 may be configured to support the electronic device to perform the foregoing step S530 and the like, and/or perform other processes of technologies described in this specification.

It should be noted that all related content of the steps in the foregoing method embodiments may be cited in function description of corresponding function modules. Details are not described herein again.

The electronic device provided in this embodiment is configured to perform the foregoing fingerprint anti-counterfeiting method, and therefore an effect the same as that of the foregoing implementation method can be achieved.

When an integrated unit is used, the electronic device may include a processing module, a storage module, and a communications module. The processing module may be configured to control and manage actions of the electronic device. For example, the processing module may be configured to support the electronic device to perform the steps performed by the obtaining unit 1201 and the determining unit 1202. The storage module may be configured to support the electronic device to store program code, data, and the like. The communications module may be configured to support communication between the electronic device and another device.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a digital signal processor (digital signal processing, DSP) and a microprocessor. The storage module may be a memory. The communications module may be specifically a device that interacts with another electronic device, such as a radio frequency circuit, a Bluetooth chip, or a Wi-Fi chip.

An embodiment further provides a computer storage medium. The computer storage medium stores a computer instruction; when the computer instruction is run on an electronic device, the electronic device is enabled to perform the foregoing related method steps, to implement the fingerprint anti-counterfeiting method in the foregoing embodiments.

An embodiment further provides a computer program product. When the computer program product is run on a computer, the computer is enabled to perform the foregoing related steps, so as to implement the fingerprint anti-counterfeiting method in the foregoing embodiment.

In addition, an embodiment of this application further provides an apparatus. The apparatus may be specifically a chip, a component, or a module. The apparatus may include a processor and a memory that are connected. The memory is configured to store computer execution instructions. When the apparatus runs, the processor may execute the computer execution instructions stored in the memory, to enable the chip to perform the fingerprint anti-counterfeiting method in the foregoing method embodiments.

The electronic device, the computer storage medium, the computer program product, or the chip provided in the embodiments is configured to perform a corresponding method provided above. Therefore, for beneficial effects that can be achieved by the electronic device, the computer storage medium, the computer program product, or the chip, refer to beneficial effects of the corresponding method provided above. Details are not described herein again.

Based on the foregoing descriptions of the implementations, a person skilled in the art may understand that for the purpose of convenient and brief descriptions, division into the foregoing function modules is merely used as an example for description. During actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatus and method may be implemented in another manner. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of this application essentially, or the part contributing to the current technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
obtaining, by an electronic device, a fingerprint image and a multi-frame touch signal; and
determining, by the electronic device based on the fingerprint image and the multi-frame touch signal, whether the fingerprint image is of a real finger or of a fake finger;
wherein the electronic device stores a multi-modal network, and the multi-modal network comprises a fingerprint image subnetwork and a touch signal subnetwork; and
wherein determining, by the electronic device, whether the fingerprint image is of a real finger or a fake finger comprises:
inputting, by the electronic device, the fingerprint image into the fingerprint image subnetwork for processing, to obtain a first eigenvector;
inputting, by the electronic device, the multi-frame touch signal into the touch signal subnetwork for processing, to obtain a second eigenvector;
fusing, by the electronic device, the first eigenvector with the second eigenvector to obtain a third eigenvector;
classifying, by the electronic device, the third eigenvector to obtain a classification result; and
determining, by the electronic device based on the classification result, whether the fingerprint image is of a real finger or of a fake finger.

2. The method according to claim 1, wherein determining, by the electronic device based on the classification result, whether the fingerprint image is of a real finger or a fake finger comprises:
when the classification result comprises a first confidence value, and the first confidence value is greater than or equal to a first threshold, determining, by the electronic device, that the fingerprint image is of a real finger, wherein the first confidence value is a confidence value at which the fingerprint image is of a real finger; or
when the classification result comprises a second confidence value, and the second confidence value is greater than or equal to a second threshold, determining, by the electronic device, that the fingerprint image is of a fake finger, wherein the second confidence value is a confidence value at which the fingerprint image is of a fake finger; and
wherein the first threshold and the second threshold are adjustable.

3. The method according to claim 1, further comprising:
before the electronic device inputs the fingerprint image into the fingerprint image subnetwork for processing, and the inputs the multi-frame touch signal into the multi-modal network for processing, fusing the fingerprint image with the multi-frame touch signal; and
after the electronic device inputs the fingerprint image into the fingerprint image subnetwork for processing, and inputs the multi-frame touch signal into the multi-modal network for processing, separating the fingerprint image and the multi-frame touch signal.

4. The method according to claim 1, further comprising:
after obtaining, by the electronic device, the fingerprint image and the multi-frame touch signal, performing, by the electronic device, normalization processing on the fingerprint image and the multi-frame touch signal.

5. The method according to claim 1, further comprising:
when the electronic device determines that the fingerprint image is of a fake finger, performing the following:
sending, by the electronic device, fake fingerprint prompt information to a user; or
sending, by the electronic device, operation failure prompt information to a user.

6. The method according to claim 1, further comprising:
when the electronic device determines that the fingerprint image is of a real finger, performing the following:
determining, by the electronic device, that the fingerprint image matches a fingerprint image preset by a user; and
determining, by the electronic device, that user identity authentication succeeds.

7. The method according to claim 1, wherein the multi-frame touch signal represents one or more of a touch strength, a touch strength change trend, a touch shape, or a touch shape change trend.

8. The method according to claim 1, wherein the multi-frame touch signal comprises:
a multi-frame touch signal synchronously collected when the fingerprint image is collected; or
a multi-frame touch signal synchronously collected when the fingerprint image is collected, and a multi-frame touch signal buffered before the fingerprint image is collected.

9. The method according to claim 1, wherein the fingerprint image is other than a first fingerprint image, and the multi-frame touch signal is a multi-frame touch signal synchronously collected when the first fingerprint image is collected.

10. The method according to claim 1, further comprising:
after obtaining, by the electronic device, the fingerprint image and the multi-frame touch signal, preprocessing, by the electronic device, the multi-frame touch signal based on a screen status or a touch collection frequency of the electronic device, wherein the preprocessing comprises one or more of interpolation processing, zero padding processing, or downsampling processing.

11. The method according to claim 1, further comprising:
after obtaining, by the electronic device, the fingerprint image and the multi-frame touch signal, obtaining, by the electronic device through truncation, a touch signal with a predetermined frame quantity or a predetermined size.

12. An electronic device, comprising:
a fingerprint sensor;
a touch sensor;

one or more processors; and one or more memories, wherein the one or more memories store one or more computer programs that are executable by the one or more processors to cause the electronic device to:

detect a touch operation in a fingerprint unlocking area;

collect, by the fingerprint sensor, a fingerprint image;

collect, by the touch sensor, a multi-frame touch signal; and determine, based on the fingerprint image and the multi-frame touch signal, whether the fingerprint image is of a real finger or of a fake finger;

wherein the electronic device stores a multi-modal network, and the multi-modal network comprises a fingerprint image subnetwork and a touch signal subnetwork; and wherein the one or more computer programs are further executable by the one or more processors to cause the electronic device to:

input the fingerprint image into the fingerprint image subnetwork for processing, to obtain a first eigenvector;

input the multi-frame touch signal into the touch signal subnetwork for processing, to obtain a second eigenvector;

fuse the first eigenvector with the second eigenvector to obtain a third eigenvector;

classify the third eigenvector to obtain a classification result; and determine, based on the classification result, whether the fingerprint image is a of a real finger or of a fake finger.

13. The electronic device according to claim 12, wherein the one or more computer programs are further executable by the one or more processors to cause the electronic device to:

when the classification result comprises a first confidence value, and the first confidence value is greater than or equal to a first threshold, determining that the fingerprint image is a fingerprint image of a real finger, wherein the first confidence value is a confidence value at which the fingerprint image is of a real finger; or when the classification result comprises a second confidence value, and the second confidence value is greater than or equal to a second threshold, determining that the fingerprint image is of a fake finger, wherein the second confidence value is a confidence value at which the fingerprint image is of a fake finger; and wherein the first threshold and the second threshold are adjustable.

14. The electronic device according to claim 12, wherein the one or more computer programs are further executable by the one or more processors to cause the electronic device to:

before the fingerprint image is input into the fingerprint image subnetwork for processing and the multi-frame touch signal is input into the multi-modal network for processing, fuse the fingerprint image with the multi-frame touch signal; and after the fingerprint image is input into the fingerprint image subnetwork for processing and the multi-frame touch signal is input into the multi-modal network for processing, separate the fingerprint image and the multi-frame touch signal.

15. The electronic device according to claim 12, wherein the one or more computer programs are further executable by the one or more processors to cause the electronic device to:

when it is determined that the fingerprint image is of a fake finger, send fake fingerprint prompt information to a user, or send operation failure prompt information to a user.

16. The electronic device according to claim 12, wherein the one or more computer programs are further executable by the one or more processors to cause the electronic device to:

when it is determined that the fingerprint image is of a real finger, determine that the fingerprint image matches a fingerprint image preset by a user; and determine that user identity authentication succeeds.

17. The electronic device according to claim 12, wherein the multi-frame touch signal comprises:

a multi-frame touch signal synchronously collected when the fingerprint image is collected; or a multi-frame touch signal synchronously collected when the fingerprint image is collected, and a multi-frame touch signal buffered before the fingerprint image is collected.

18. The electronic device according to claim 12, wherein the one or more computer programs are further executable by the one or more processors to cause the electronic device to:

after the fingerprint image and the multi-frame touch signal are obtained, preprocessing the multi-frame touch signal based on a screen status or a touch collection frequency of the electronic device, wherein the preprocessing comprises one or more of interpolation processing, zero padding processing, or downsampling processing.

\* \* \* \* \*